US 8,249,586 B2
Aug. 21, 2012

(12) United States Patent
Bosenbecker

(10) Patent No.: US 8,249,586 B2
(45) Date of Patent: Aug. 21, 2012

(54) AIRBORNE EMERGENCY CELL PHONE ROUTER

(75) Inventor: Raymond W. Bosenbecker, Chesterfield, MO (US)

(73) Assignee: The Boeing Company, Chicago, IL (US)

(*) Notice: Subject to any disclaimer, the term of this patent is extended or adjusted under 35 U.S.C. 154(b) by 498 days.

(21) Appl. No.: 11/421,925

(22) Filed: Jun. 2, 2006

(65) Prior Publication Data

US 2007/0281705 A1 Dec. 6, 2007

(51) Int. Cl.
*H04W 4/00* (2009.01)

(52) U.S. Cl. ..... 455/431; 455/11.1; 455/12.1; 455/13.1; 455/421

(58) Field of Classification Search .................. 455/431, 455/456, 457
See application file for complete search history.

(56) References Cited

U.S. PATENT DOCUMENTS

| | | | |
|---|---|---|---|
| 6,324,398 B1 * | 11/2001 | Lanzerotti et al. | 455/431 |
| 6,603,967 B1 * | 8/2003 | Sinivaara et al. | 455/431 |
| 6,735,438 B1 * | 5/2004 | Sabatino | 455/427 |
| 7,031,728 B2 * | 4/2006 | Beyer, Jr. | 455/456.3 |
| 7,483,696 B1 * | 1/2009 | Mitchell | 455/431 |
| 2004/0142658 A1 * | 7/2004 | McKenna et al. | 455/11.1 |
| 2007/0183346 A1 * | 8/2007 | Thubert et al. | 370/254 |
| 2007/0258417 A1 * | 11/2007 | Harvey et al. | 370/338 |

* cited by examiner

*Primary Examiner* — Nick Corsaro
*Assistant Examiner* — Amanuel Lebassi

(57) ABSTRACT

Methods, systems, and articles of manufacture enable routing a communication from a cell phone associated with a service provider in which the cell phone is located in a predetermined area in which the service provider does not have an operational base station or in which routing assistance is required. A cell base station having one or more antennas is provided in an aircraft. Each of the antennas is configured to monitor a respective sector of the predetermined area for a cell phone communication when the aircraft is flown in proximity to the predetermined area. A registration request from a first cell phone in the predetermined is detected via the cell base station and an ID and location associated with the first cell phone is routed to a ground based telephone switching office, such as the mobile telephone switching office associated with the service provider of the detected cell phone.

10 Claims, 18 Drawing Sheets

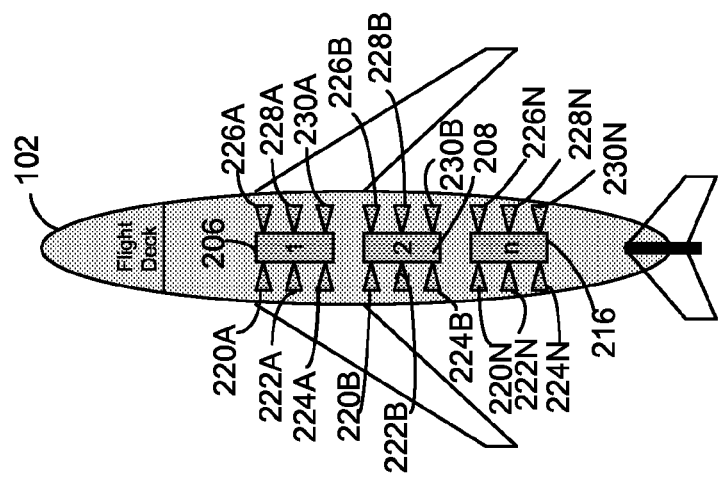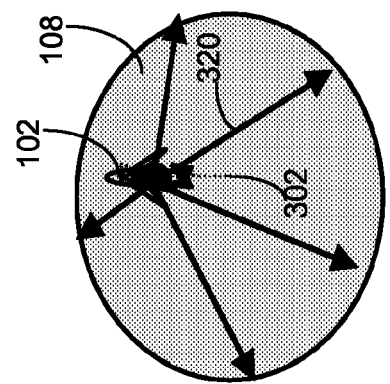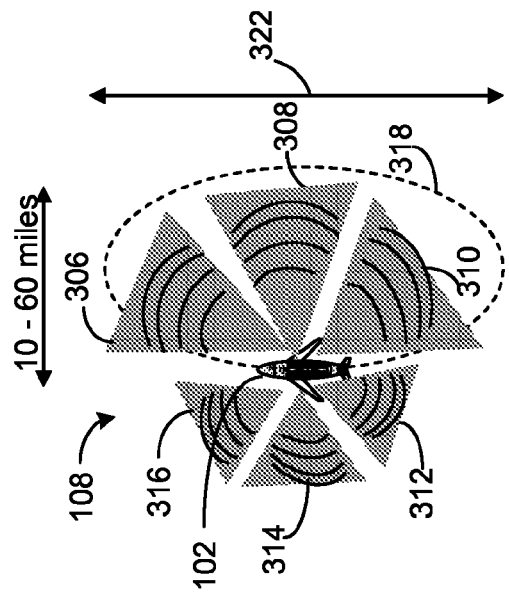

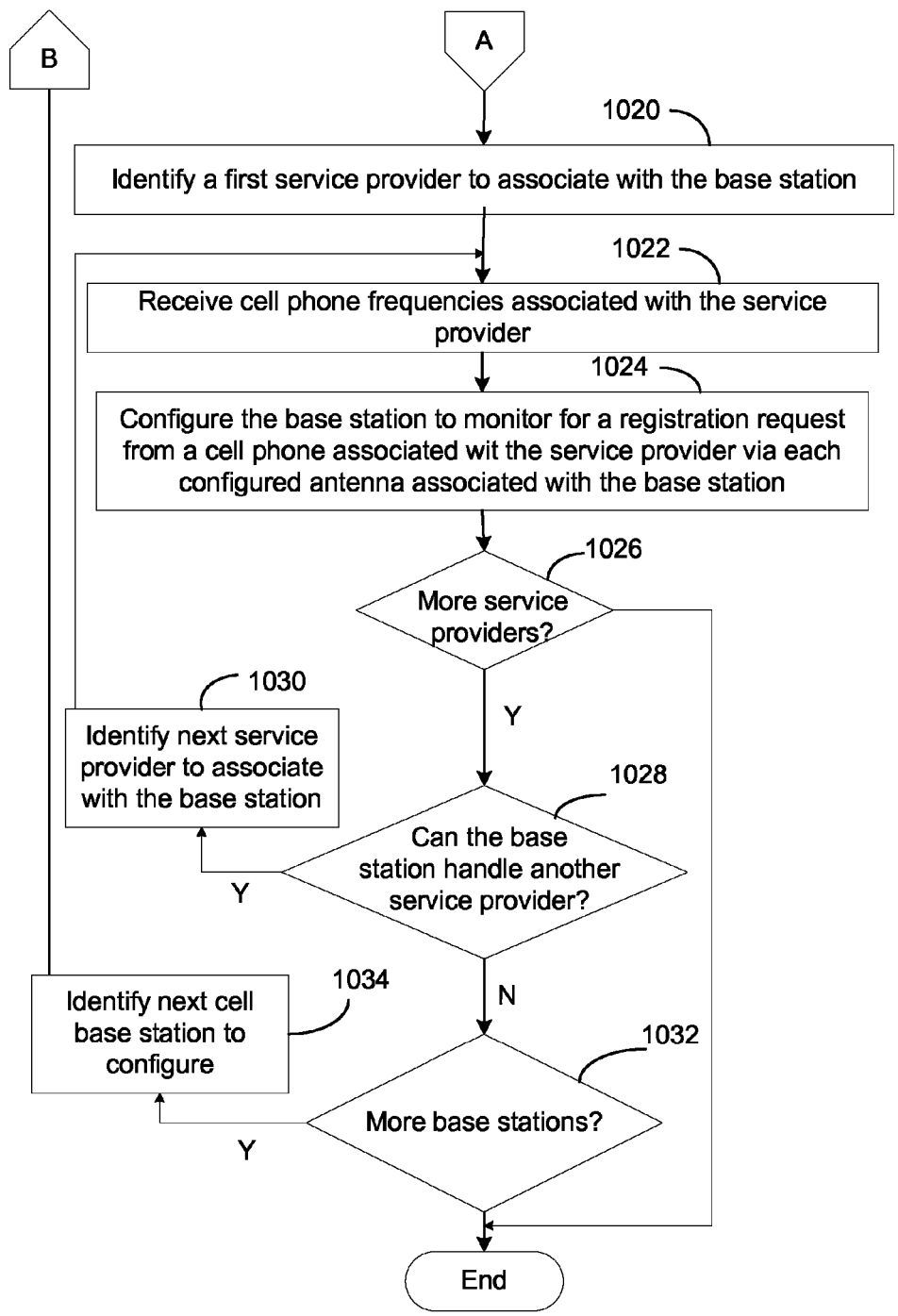

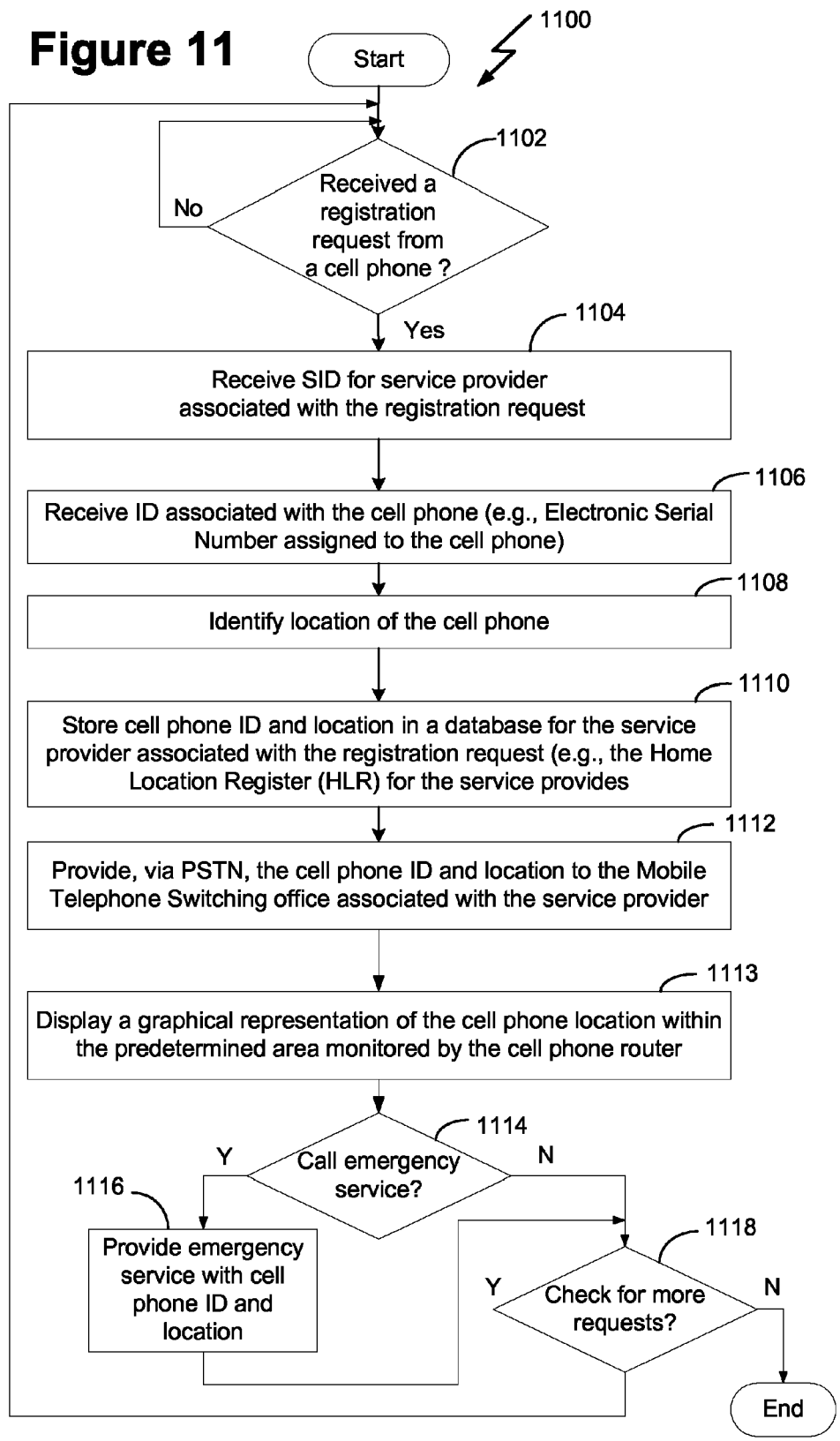

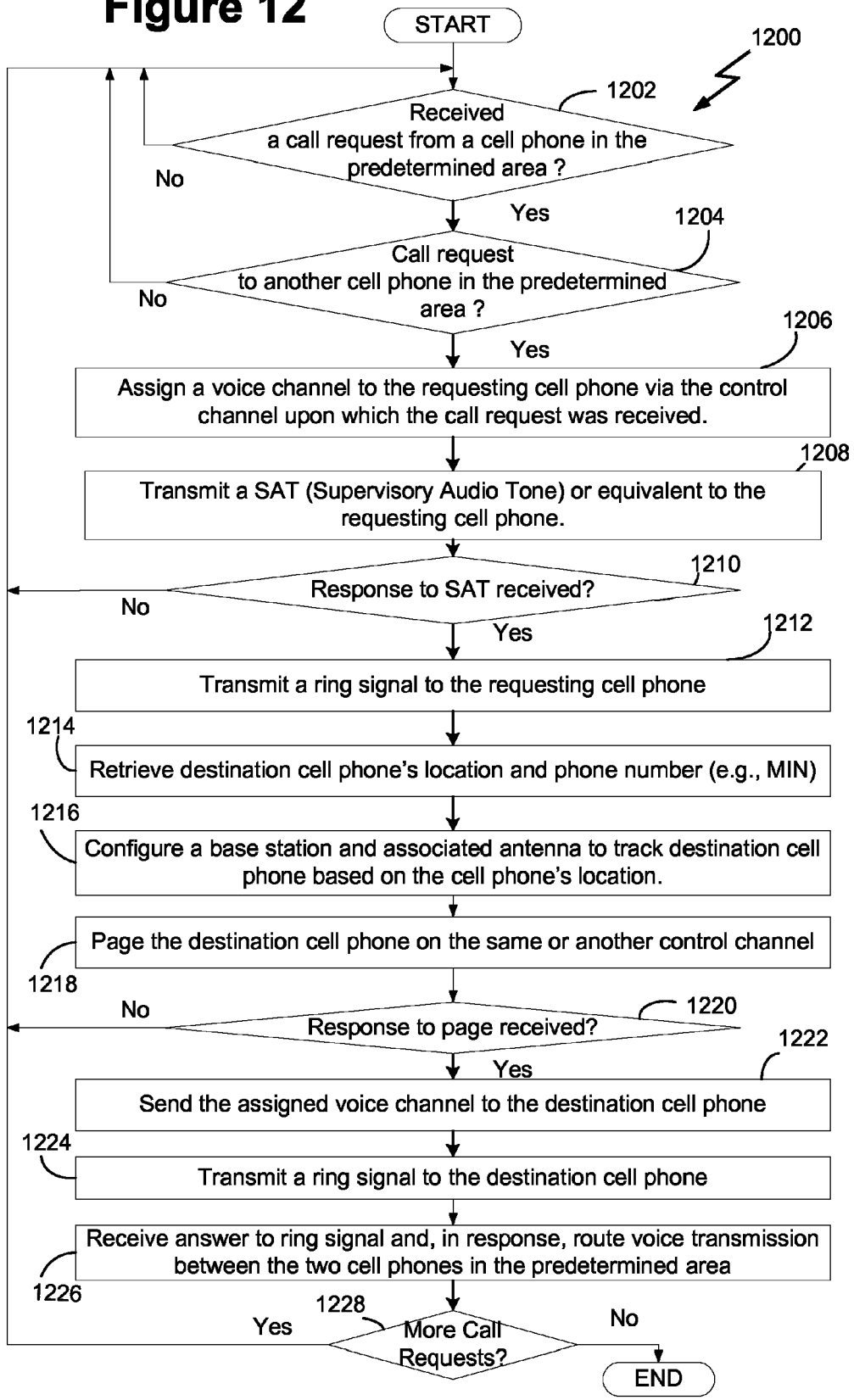

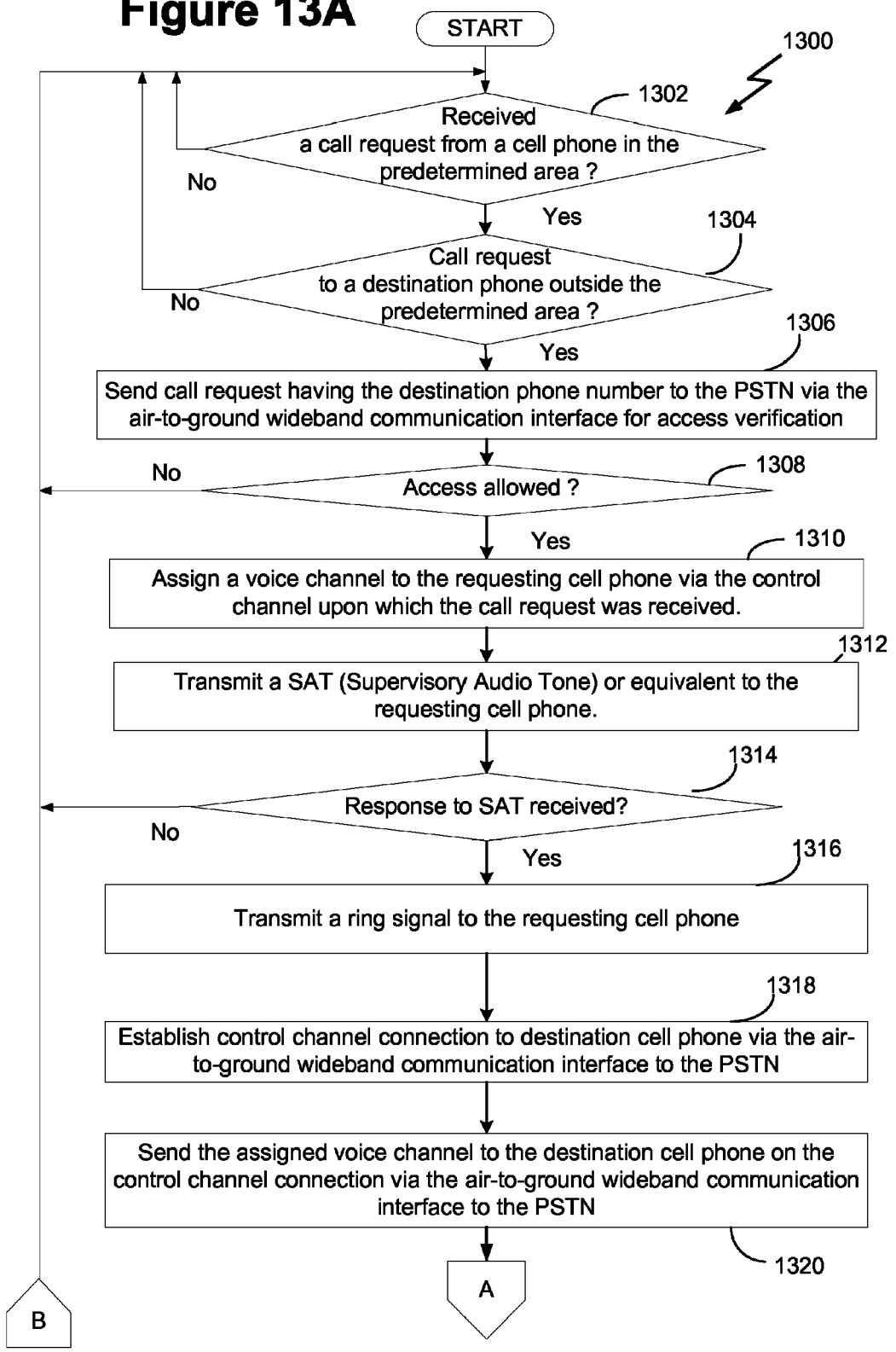

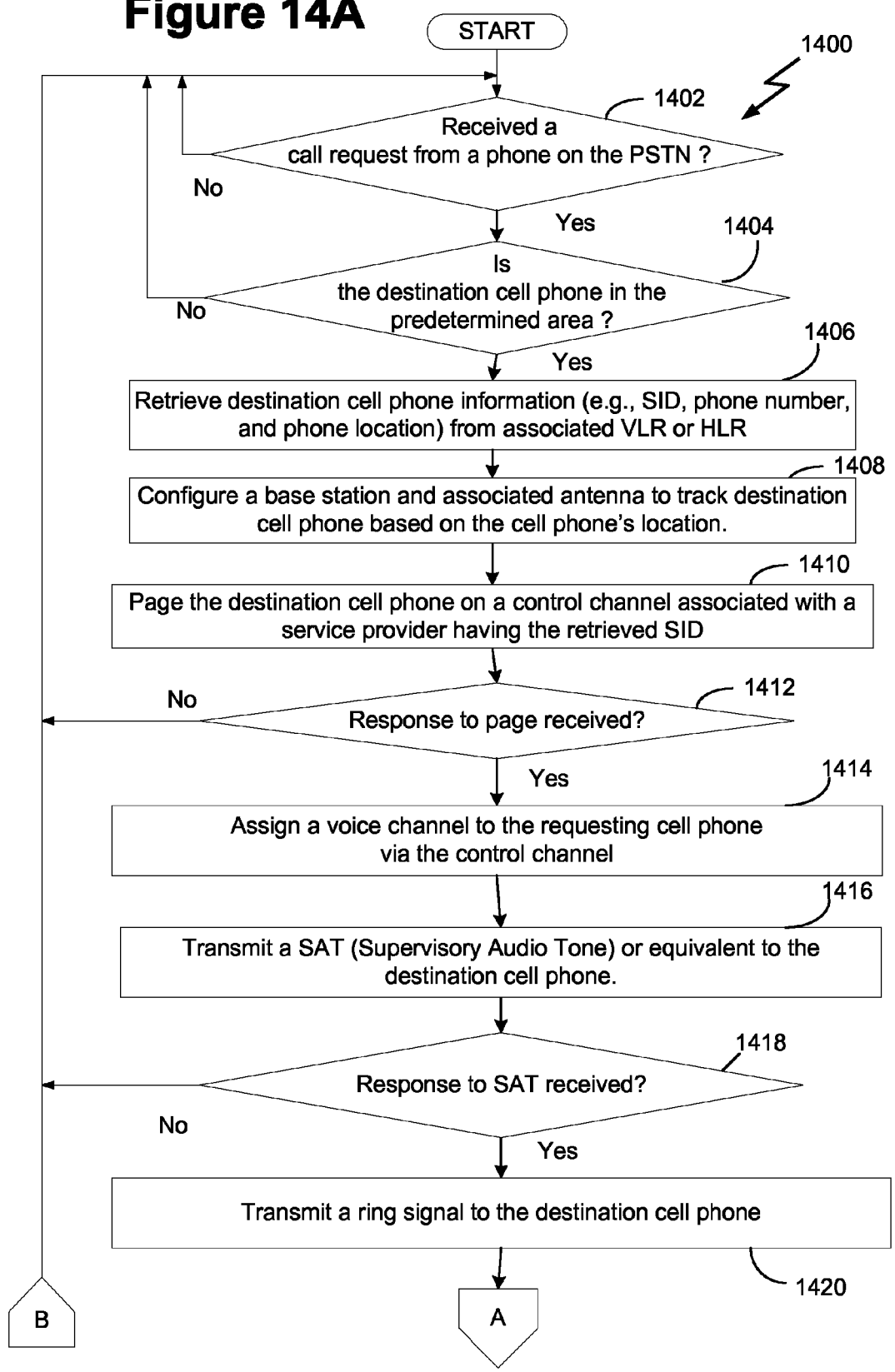

AIRBORNE EMERGENCY CELL PHONE ROUTER

BACKGROUND OF THE INVENTION

The present invention relates generally to cell phone communication, and more particularly, to methods and systems for detecting a cell phone in an area via an airborne vehicle and routing a call from the cell phone to another phone.

Communication to a mobile or cell phone is typically provided by an associated cellular telephone company service provider ("service provider"), such as Sprint, T-Mobile, Verizon, or Cingular, using a respective infrastructure of ground-based cell phone base station towers operatively connected to an Mobile Telephone Switching Office (MTSO) associated with the service provider. Each base station tower uses low-power transmitters and operates on a band of frequencies associated with the respective service provider to provide cell phone communication access to a limited area or cell (e.g., a hexagon area of approximately 10 square miles) within the service provider's infrastructure. Each MTSO typically handles all of the phone connections from the respective service provider's base station towers to the land-based public switch telephone network (PSTN).

During a natural disaster, such as a hurricane or tornado, base station towers associated with a service provider are often destroyed or rendered inoperable resulting in an interruption in communication access for cell phones registered with the service provider and located within a cell area associated with an inoperable base station tower. The interruption in cell communication access can severely inhibit search and rescue activities to individuals trapped or in need of medical care within the cell area associated with inoperable base station tower. This problem may also arise when a cell phone user travels outside of the associated service provider's cell coverage infrastructure to a remote area where the user may need emergency assistance. For example, a skier with a cell phone may become trapped via an avalanche in a remote mountain area where the associated service provider does not have a base station tower.

Therefore, a need exists for systems and methods that overcome the problems noted above and others previously experienced for detecting a cell phone in an area with inoperable base station tower and routing a call from the cell phone to another phone.

SUMMARY OF THE INVENTION

In accordance with methods consistent with the present invention, a method is provided for routing a communication from a cell phone associated with a service provider. The cell phone is located in a predetermined area in which the service provider does not have an operational base station or in which routing assistance is required. The method comprises providing a cell base station in an aircraft. The cell base station has a plurality of antennas. The method further comprises configuring each of the antennas to monitor a respective sector of the predetermined area for a cell phone communication when the aircraft is flown in proximity to the predetermined area; detecting, via the cell base station, a registration request from a first cell phone in the predetermined area; and routing an ID and location associated with the first cell phone to a ground based telephone switching office.

In accordance with articles of manufacture consistent with the present invention, a computer-readable medium containing instructions to perform a method for routing a communication from a cell phone associated with a service provider is provided. The cell phone is located in a predetermined area in which the service provider does not have an operational base station or in which routing assistance is required. The method comprises providing a cell base station in an aircraft. The cell base station has a plurality of antennas. The method further comprises configuring each of the antennas to monitor a respective sector of the predetermined area for a cell phone communication when the aircraft is flown in proximity to the predetermined area; detecting, via the cell base station, a registration request from a first cell phone in the predetermined area; and routing an ID and location associated with the first cell phone to a ground based telephone switching office.

In accordance with systems consistent with the present invention, a system is provided for routing a communication from a cell phone associated with a service provider. The cell phone is located in a predetermined area in which the service provider does not have an operational base station or in which routing assistance is required. The system comprises an aircraft having a cell base station. The cell base station having a plurality of antennas. The system further comprises: means for configuring each antenna of the cell base station to monitor a respective sector of the predetermined area for a cell phone communication when the aircraft is flown in proximity to the predetermined area; means for detecting, via the cell base station, a registration request from a first cell phone in the predetermined area; and means for routing an ID and location associated with the first cell phone to a ground based telephone switching office.

In accordance with systems consistent with the present invention, a cell phone router system adapted to operate on an aircraft is provided. The cell phone router system comprises: an air-to-ground wideband communication interface operatively configured to communicate with a ground based telephone switching office via a ground-to-air wideband communication interface when the cell phone router system is airborne; a telecommunication switching system operatively connected to the air-to-ground wideband communication interface; and one or more cell base stations operatively connected to the telecommunication switching system, each cell base station having at least one antenna. The telecommunication switching system includes: a memory comprising a routing manager program that configures each of the antennas of each cell base station to monitor a respective sector of a predetermined area for a cell phone communication when the aircraft is flown in proximity to the predetermined area, detects, via a first of the one or more cell base stations, a registration request from a first cell phone in the predetermined area and associated with a service provider, and routes an ID and location associated with the first cell phone to the ground based telephone switching office. The telecommunication switching system further includes a processor to run the routing manager program.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings:

FIG. 3A depicts an exemplary configuration of the cell base stations within the aircraft;

FIG. 3B depicts an exemplary predetermined area of coverage by the cell base stations when the aircraft is at a predetermined altitude;

FIG. 3C depicts a plurality of sectors of the predetermined area, where each sector corresponds to a portion of the predetermined area monitored by a respective base station receiver antenna;

FIGS. 10A-B depict a flow diagram of an exemplary process performed by the cell phone router to configure the cell base stations to monitor for a cell phone in the predetermined area;

FIG. 11 depicts a flow diagram of an exemplary process performed by the cell phone router to detect a cell phone in the predetermined area;

FIG. 12 depicts a flow diagram of an exemplary process performed by the cell phone router for handling a call request from one cell phone within the predetermined area to another cell phone within the predetermined area;

FIGS. 13A-B depict a flow diagram of an exemplary process performed by the cell phone router for handling a call request from a cell phone within the predetermined area to another phone on the PSTN;

FIGS. 14A-B depicts a flow diagram of an exemplary process performed by the cell phone router for handling a call request from a phone on the PSTN to a cell phone within the predetermined area.

DETAILED DESCRIPTION OF THE INVENTION

Reference will now be made in detail to an implementation in accordance with methods, systems, and products consistent with the present invention as illustrated in the accompanying drawings.

Figure 1:
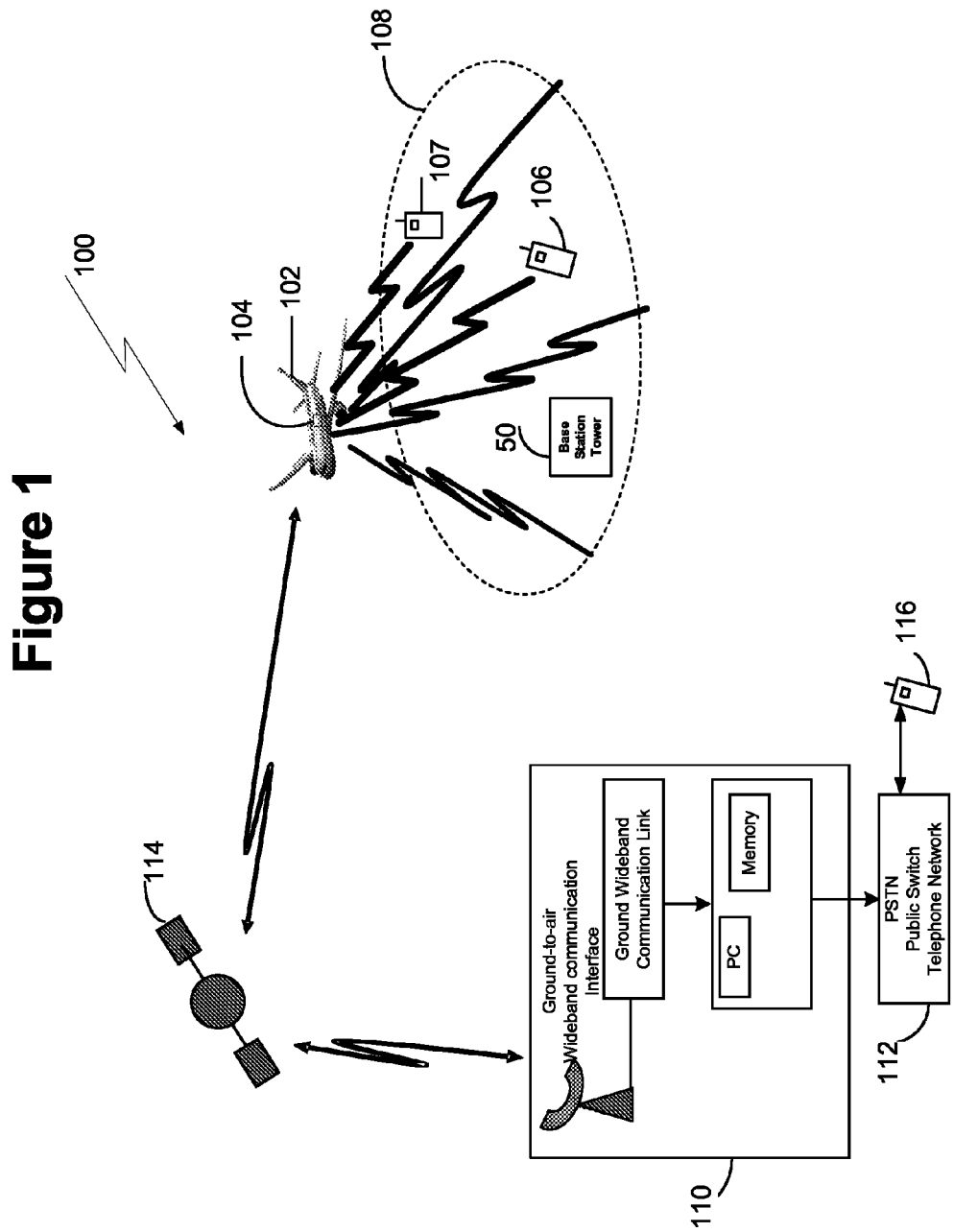
FIG. 1 is a diagram of a cell phone communication routing system, including an aircraft having a cell phone router for providing communication access to a cell phone in accordance with the present invention.

FIG. 1 is a diagram of a cell phone communication routing system 100 consistent with the present invention. The routing system 100 includes an aircraft 102 having a cell phone router 104 operatively configured to provide communication access to a cell phone 106 associated with a service provider and located within a predetermined area 108 in which the service provider does not have an operational base station or in which routing assistance may be required. For example, the predetermined area 108 may be an area in which a natural disaster, such as a hurricane or tornado, has occurred causing base station towers (e.g., base station tower 50) associated with the service provider to be rendered inoperative resulting in an interruption in communication access for the cell phone 106 and other cell phones (e.g., cell phone 107) registered with the service provider and currently located within the predetermined area 108. Alternatively, the predetermined area 108 may be an area in which the associated service provider does not have a base station or in which the base station 50 is currently not able to handle another communication request from an associated or registered cell phone 106. Although FIG. 1 depicts the aircraft 102 as a plane, the cell phone router 104 described herein may be implemented in a helicopter, a blimp, or other aircraft adapted to fly the cell phone router 104 in proximity to the predetermined area 108.

In one implementation, the cell phone router 104, when airborne in proximity to the predetermined area 108, is operatively configured to detect the presence of a plurality of cell phones 106 and 107 in the predetermined area 108, receive a communication request from one of the plurality of cell phones (e.g., cell phone 106), determine that communication request is directed to another of the plurality of cell phones (e.g., cell phone 107) in the predetermined area 108, and to wirelessly connect the one cell phone 106 to the other cell phone 107 in response to the communication request as described in further detail below.

As shown in FIG. 1, the cell phone communication routing system 100 may also include a ground-to-air wideband communication interface 110 operatively connected to the PSTN 112. The wideband communication interface 110 is operatively configured to provide one or more wireless communication channels to the cell phone router 104, either directly or via a communications satellite 114, for routing a communication from the cell phone 106 and/or 107 to another phone via the PSTN 112 (e.g., a phone responsive to a 911 call request or other land based accessible phone) in accordance with the present invention. The ground-to-air wideband communication interface 110 may be a Connexion$^{SM}$ ground station used by Boeing Corp. to provide Internet connectivity to passengers in an aircraft. The Connexion$^{SM}$ system, which includes the Connexion$^{SM}$ ground station (e.g., the ground-to-air wideband interface 110) and a Connexion$^{SM}$ aircraft-to-space station (e.g., configured as an air-to-ground wideband communication interface 218 of the cell phone router 104 as discussed below), operates in the 14.0-14.5 GHz band for aircraft-to-space links and in portions of the 11.2-12.75 GHz band (depending on the geographic region) for space-to-aircraft links.

Figure 2:
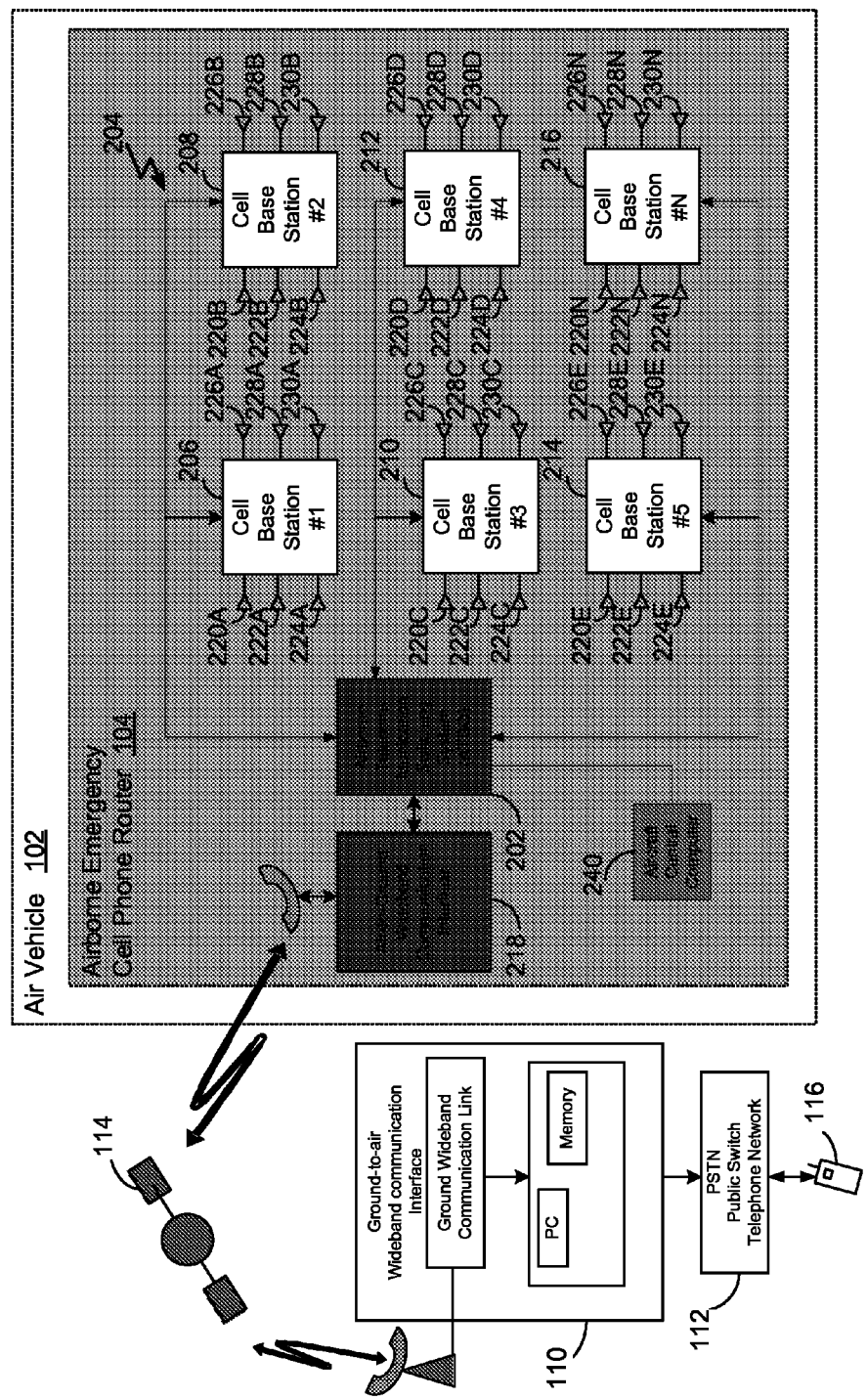
FIG. 2 depicts an exemplary block diagram of the cell phone router of FIG. 1, in which the cell phone router includes a plurality of cell base stations for detecting a cell phone within the predetermined area.

FIG. 2 depicts an exemplary block diagram of the cell phone router 104. The cell phone router 104 includes a telecommunication switching system 202, one or more cell base stations 206, 208, 210, 212, 214, and 216 (collectively base stations 204) and an air-to-ground wideband communication interface 218 operatively connected to the telecommunication switching system 202. The cell phone router 104 may also include or be operatively connected to the aircraft central computer 240 to receive aircraft 102 speed, altitude, attitude and other navigation or global positioning information for use in detecting and tracking a cell phone 106 or 107 in the predetermined area 108 in accordance with the present invention.

The telecommunication switching system 202 corresponds to one or more standard mobile telephone switching systems, each associated with a respective service provider, to control associated base stations 206, 208, 210, 212, 214, and 216 to monitor a call from a cell phone 106 or 107 associated the respective service provider while the cell phone 106 or 107 is within the predetermined area 108, track the location of the cell phone 106 or 107 within the predetermined area 108, and handle connection of the call between the cell phone 106 or 107 and the PSTN 112. In one implementation, the telecommunication switching system 202 may also be configured to track billing information associated with a cell phone 106 or 107 detected as being present in the predetermined area 108.

The air-to-ground wideband communication interface 218, similar to the ground-to-air wideband communication interface 110, is operatively configured to provide one or more wireless communication channels to the cell phone router 104, either directly or via a communications satellite 114, for routing a communication from the cell phone 106 and/or 107 to another phone via the PSTN 112 (e.g., a phone responsive to a 911 call request or other land based accessible phone) in accordance with the present invention. However, the air-to-ground wideband communication interface 218 is operatively connected to the telecommunication switching system 202 rather than the PSTN 112. In one implementation, the air-to-ground wideband communication interface 218 is a Boeing Connexion$^{SM}$ aircraft-to-space station adapted to interface to the telecommunication switching system 202 In this implementation, the cell phone router 104 has the equivalent of a PSTN T1 line (1.54 megabits per second) by using Connexion$^{SM}$ aircraft-to-space station or equivalent for the air-to-ground wideband communication interface 218. For example, the Connexion$^{SM}$ aircraft-to-space station is capable of receiving a total data rate of between about 5 Mbsps and about 10 Mbps on one or multiple communication channels between the Connexion$^{SM}$ aircraft-to-space station and either the ground-to-air wideband communication interface 110 or the communications satellite 114. Each forward link signal transmitted to the cell phone router 104 carries an IP packet stream of video and data content. Packets are unicast, multicast or broadcast to the cell phone router 104 in the antenna coverage region of the ground-to-air wideband communication interface 110 or the communications satellite 114. The air-to-ground wideband communication interface 218 accepts those packets addressed to the telecommunication switching system 202 and routes the accepted packets to the telecommunication switching system 202 via a local area network or standard bus for processing.

The cell phone router's 104 telecommunication switching system 202 is operatively configured to send data packets (e.g., call registration messages, call request messages, call audio data, call video data, or other cell phone 106 or 107 communication message) to the air-to-ground wideband communication interface 218. The air-to-ground wideband communication interface 218 is operatively configured to transmit the data packets (using a wireless direct sequence spread spectrum (DSSS) waveform or other known communication transport technique) to the ground-to-air wideband communication interface 110, either directly or via the communications satellite 114, for routing to the PSTN 112. In one implementation, the data packets are transmitted by the air-to-ground wideband communication interface 218 at a data rate of between about 16 kbps and about 1.5 Mbps.

Each cell base station 206, 208, 210, 212, 214 and 216 may be a Flexent® Modular Cell base station commercially available form Lucent Technologies, a Telos Transportable GSM Network base station, or other base station having one or more distributed antenna systems or antenna groups (e.g., antenna groups 220A, 222A, 224A, 226A, 228A, 230A in FIG. 2) that may each be operatively oriented in the aircraft 102 to monitor a respective sector 306, 308, 310, 312, 314, or 316 of the predetermined area 108 when the aircraft 102 is at a predetermined altitude 302 above or in proximity to the predetermined area 108 as shown in FIGS. 3B-3C. Each cell base station 206, 208, 210, 212, 214 and 216 may be configured by the cell phone communication control computer system 602 to support a standard air interface transport standard, such as ANS J-STD-008 for 1.9 GHz, T1A/E1A 95-A; T1A/E1a 95-B for 850 MHz, and CDMA 2000.

In one implementation, each cell base station 206, 208, 210, 212, 214 and 216 comprises two Flexent® Modular Cell 4.0 base stations, each of which is capable of providing coverage for three of six sectors (e.g., sector 306, 308, 310, 312, 314, or 316 in FIG. 3C) of the predetermined area 108. As shown in FIG. 3C, the aircraft 102 may fly a flight profile 318 to allow the cell phone router 104 to continue to monitor the predetermined area 108 via the cell base stations 206, 208, 210, 212, 214, and 216. To continue to monitor the predetermined area 108, each antenna group (e.g., 220A, 222A, 224A, 226A, 228A, 230A) is configured to have a look down angle 320 that varies with a range 322 and an attitude of the aircraft 102 in relation to the predetermined area 108. In one implementation, the cell phone router 104 is operatively configured to cause each antenna group associated with a respective cell base station (e.g., cell base station 206) to adjust the RF power level and look down angle 320 of each antenna in the respective antenna group the sectors 306, 308, 310, 312, 314, or 316 to continue to collectively monitor the predetermined area 108 as the aircraft flies along its flight profile 318.

In the implementation shown in FIG. 2, each cell base station 206, 208, 210, 212, 214, and 216 has a respective plurality of antenna groups 220A, 222A, 224A, 226A, 228A, 230A (collectively antenna group A); 220B, 222B, 224B, 226B, 228B, 230B, (collectively antenna group B); 220C, 222C, 224C, 226C, 228C, 230C, (collectively antenna group C); 220D, 222D, 224D, 226D, 228D, 230D, (collectively antenna group D); 220E, 222E, 224E, 226E, 228E, 230E, (collectively antenna group E); or 220N, 222N, 224N, 226N, 228B, 230B, (collectively antenna group N). In one implementation, each antenna group (e.g., group 226A, 228A, and 230A) includes a receiving antenna (e.g., antenna 420A, 426A, or 432A in FIGS. 4 and 5) for receiving a voice or a data communication associated with a call from a cell phone 106 or 107 on one frequency, a transmitting antenna (e.g., antenna 422A, 428A, or 434A) for transmitting a voice or a data communication associated with the call from a cell phone 106 or 107 on another frequency, and a control antenna (e.g., antenna 424A, 430A, or 436A) for transmitting and receiving control codes from a cell phone 106 or 107. Control codes may include a system identification code (SID) that the respective base station transmits to cell phones 106 or 107 within a cell (e.g., predetermined area 108) to identify the service provider associated with the base station and providing cell communication service to that cell. Control codes may also include an electronic serial number for identifying the cell phone 106 or 107 to the base station communicating with the cell phone 106 or 107. Control codes may further include known codes for setting up a call on a channel and changing the channel of the call, where a respective channel is associated with a frequency pair; one frequency of the frequency pair is associated with the receiving antenna and the other frequency is associated with the transmitting antenna. As known to one skilled in the art, each service provider is assigned a respective SID and allotted by the Federal Communication Commission (FCC) a band of frequencies of the cell phone spectrum (e.g., 824-894 MHz, 900 MHz band, 1800 MHz band, or 1900 MHz band) to operate.

In another implementation, each antenna group (e.g., group 226A) may have a single antenna that performs the function of a receiving antenna (e.g., antenna 420A, 426A, or 432A), a transmitting antenna (e.g., antenna 422A, 428A, or 434A), and a control antenna (e.g., antenna 424A, 430A, or 436A).

Each cell base station 206, 208, 210, 212, 214, and 216 is operatively controlled by the telecommunication switching system 202 such that each antenna group of each cell base station 206, 208, 210, 212, 214, and 216 is operatively configured to monitor a respective portion or sector (e.g., sector 306, 308, 310, 312, 314, or 316 in FIG. 3C) of the predetermined area 108 to detect the presence of a cell phone 106 or 107 within the respective sector, and to establish or maintain a communication link to the detected cell phone while the detected cell phone is within the sector monitored by an antenna group of the cell base station 206, 208, 210, 212, 214, or 216.

In one implementation, each cell base station 206, 208, 210, 212, 214, and 216 is associated with a respective service provider and is configured by the telecommunication switching system 202 to monitor each sector 306, 308, 310, 312, 314, or 316 for a cell phone 106 or 107 registered with or subscribed to the service provider. In another implementation, each cell base station 206, 208, 210, 212, 214, and 216 is associated with a respective plurality of service providers depending on the carrier capacity of the base station and is configured by the telecommunication switching system 202 to monitor each of the sectors 306, 308, 310, 312, 314, or 316 for a cell phone 106 or 107 registered with any one of the plurality of service providers associated with the respective base station 206, 208, 210, 212, 214 or 216. Alternatively, each cell base station 206, 208, 210, 212, 214, and 216 may be associated with a respective plurality of service providers depending on the carrier capacity of the base station and be configured by the telecommunication switching system 202 to monitor a respective one of the sectors 306, 308, 310, 312, 314, or 316 for a cell phone 106 or 107 registered with any one of the plurality of service providers associated with the respective base station 206, 208, 210, 212, 214 or 216. In this implementation, the cell base stations 206, 208, 210, 212, 214, and 216 collectively monitor each of the sectors in the predetermined area 108.

Figure 4:
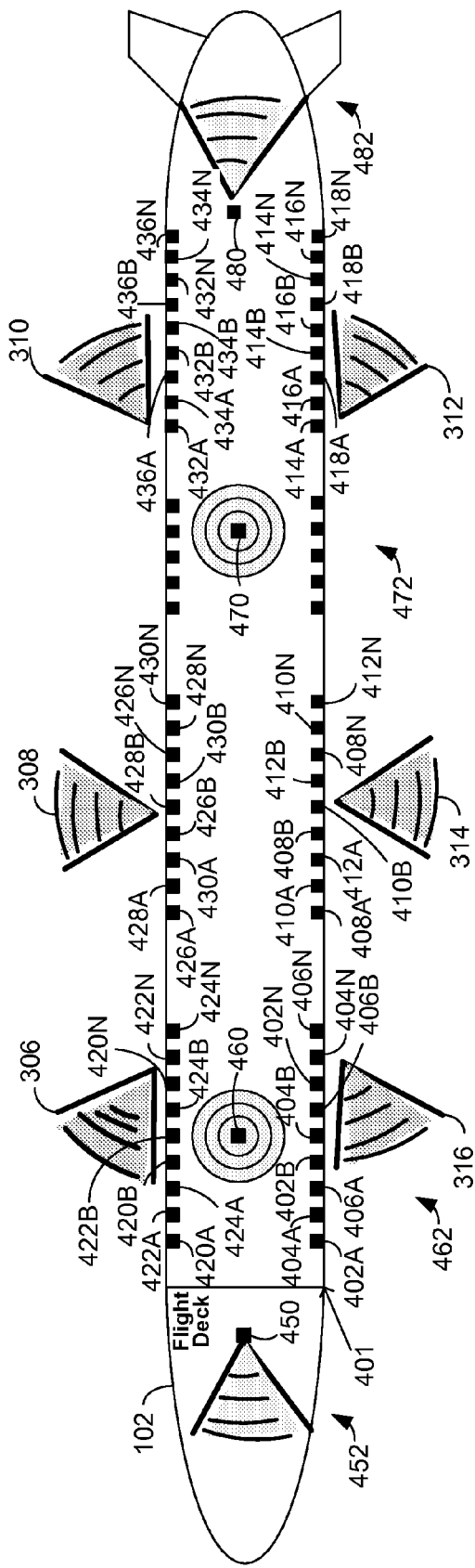
FIG. 4 is a top-level cut away view of the aircraft, depicting each antenna of each antenna group associated with a respective base station operatively positioned and configured to monitor a respective one of six sectors that defined the predetermined area for a cell phone.
Figure 5:
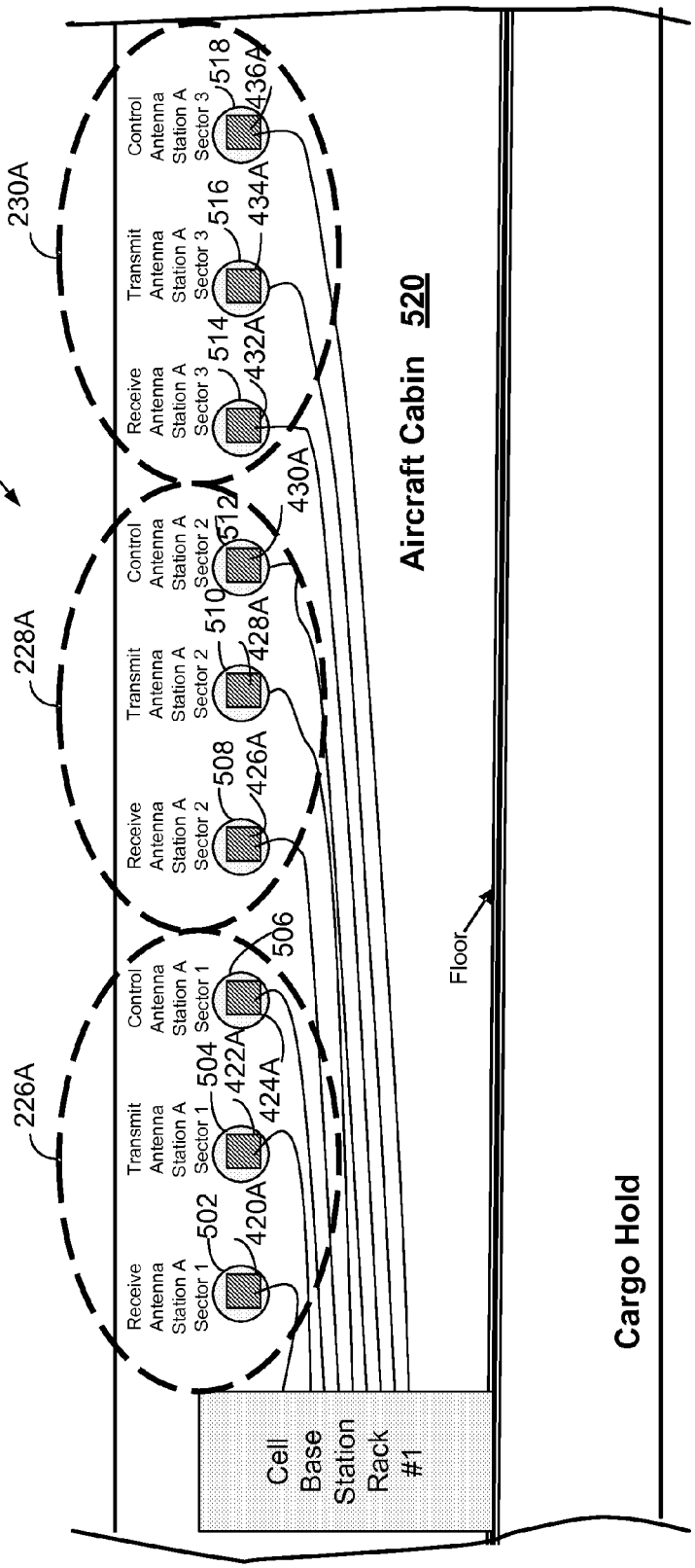
FIG. 5 depicts a side cutaway view of a portion of the aircraft in which each antenna of each antenna group associated with a respective base station is operatively positioned in association with a respective one of a plurality of windows of the aircraft.

In the implementation shown in FIG. 4, each antenna group A-N of each cell base station 206, 208, 210, 212, 214, and 216 is distributed along the perimeter 401 of the aircraft 102 so each base station has one antenna group A-N disposed to monitor a respective sector 306, 308, 310, 312, 314, and 316 in the predetermined area. For example, in the implementation shown in FIGS. 4 and 5, the aircraft 102 is a commercial airplane having a plurality of windows 502, 504, 508, 510, 514, 516, and 518 disposed longitudinally along a cabin 520 of the aircraft 102. Each of the antenna groups A though N are distributed along the perimeter 401 of the cabin 520 such that each cell base station has an antenna 402A, 404A, 406A, 402B, 404B, 406B, 402N, 404N, 406N; 408A, 410A, 412A, 408B, 410B, 412B, 408N, 410N, 412N; 414A, 416A, 418A, 414B, 416B, 418B, 414N, 416N, 418N; 420A, 422A, 424A, 420B, 422B, 424B, 420N, 422N, 424N; 426A, 428A, 430A, 426B, 428B, 430B, 426N, 428N, 430N; 432A, 434A, 436A, 432B, 434B, 436B, 432N, 434N, 436N is configured to monitor a respective sector 306, 308, 310, 312, 314, and 316 via a respective aircraft 102 window 502, 504, 508, 510, 514, 516, and 518. Thus, each aircraft 102 window 502, 504, 508, 510, 514, 516, and 518 may serve as a radome for a respective cell base station antenna to facilitate monitoring an associated sector 306, 308, 310, 312, 314, and 316 of the predetermined area. In addition, in one implementation, one or more of the cell base stations 206, 208, 210, 212, 214, and 216 may have an auxiliary antenna 450, 460, 470, or 480 positioned in the front 452, forward-bottom 462, rear-bottom 472, or rear 482, respectively, of the aircraft 102 such that each auxiliary antenna is able to monitor all or a portion of the predetermined area 108 in accordance with the present invention.

Figure 6:
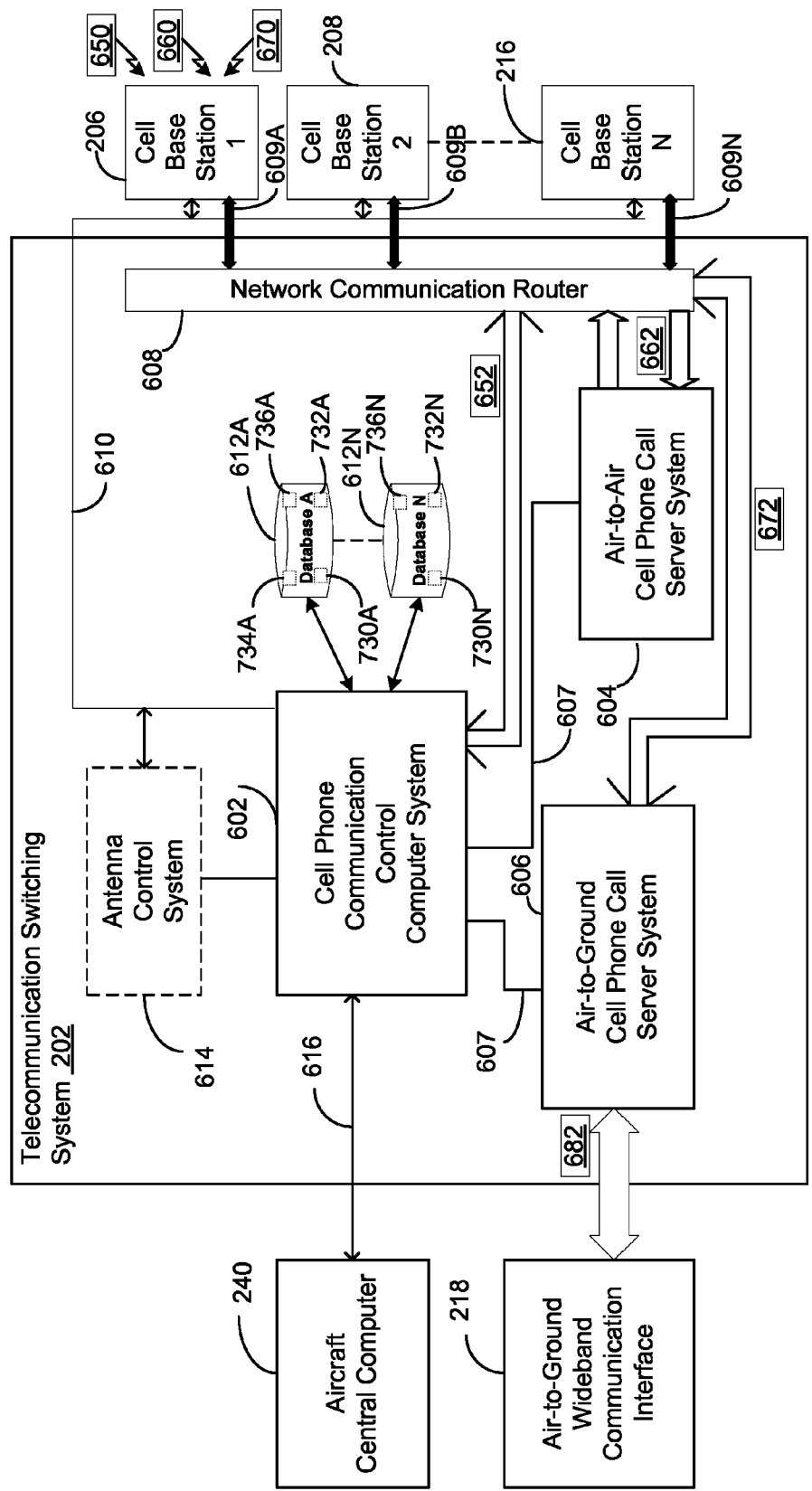
FIG. 6 depicts a block diagram of an exemplary telecommunications switching system of the cell phone router consistent with the present invention.

Turning to FIG. 6, an exemplary block diagram of the telecommunications switching system 202 of the cell phone router 104 is depicted. The telecommunications switching system 202 includes a cell phone communication control computer system 602, an air-to-air cell phone call server system 604, and an air-to-ground cell phone call server system 606. As described below, the air-to-air cell phone call server system 604 is operatively configured to manage a call between two cell phones 106 and 107 in the predetermined area 108. The air-to-ground cell phone call server system 604 operatively configured to manage a call between a cell phone 106 or 107 within the predetermined area 108 and the PSTN 112 via the air-ground wideband communication interface 218. One skilled in the art will appreciate that the two server systems 604 and 606 may be incorporated in the cell phone communication control computer system 602. The cell phone communication control computer system 602 is operatively configured to initialize the base stations 206, 208, 210, 212, 214, and 216 to monitor the sectors 306, 308, 310, 312, 314, and 316 and to control the air-to-air cell phone call server system 604 and the air-to-ground cell phone call server system 606 via a local network 607. The local network 607 may be a local area network ("LAN"), WAN, Peer-to-Peer, or other network using standard communications protocols. The local network 607 may include hardwired, as well as wireless branches.

The telecommunications switching system 202 may also include a network communication router 608 to connect each cell phone communication bus (e.g., 609A, 609B, or 609N in FIG. 6) of each cell base station 206, 208, 210, 212, 214 or 216 to the cell phone communication control computer system 602, the air-to-air cell phone call server system 604 and the air-to-ground cell phone call server system 606. The cell phone communication control computer system 602, the air-to-air cell phone call server system 604 and the air-to-ground cell phone call server system 606 may communicate with each cell base station using a standard network protocol such as TCP/IP. The cell phone communication control computer system 602 may also be operatively connected to each cell base station 206, 208, 210, 212, 214 and 216 via a separate control/data bus 610 to allow the cell phone communication control system 602 to configure each cell base station 206, 208, 210, 212, 214 and 216 and the respective antenna groups A-N of each cell base station so that each cell base station 206, 208, 210, 212, 214, and 216 is adapted to monitor each sector 306, 308, 310, 312, 314, and 316 of the predetermined area 108 in accordance with the present invention. The communication router 608 may comprise a Lucent Flexent Wireless Router, a Lucent Flexent Radio Network Controller or other known radio network router/controller.

The telecommunications switching system 202 may also include one or more databases 612A-612N operatively connected to the cell phone communication control computer system 602. As discussed in further detail below, the cell phone communication control computer system 602 may store a home location register (e.g., 730A-N) for each service provider supported by the cell base stations 206, 208, 210, 212, 214 and 216 on a respective database 612A-612N so the control computer 602 updates the home location register with the ID and location of each cell phone 106 or 107 detected in the predetermined area 108 in accordance with the present invention.

In one implementation, the telecommunications switching system 202 includes an antenna control system 614 operatively connected between the cell phone communication control computer system 602 and the control/data bus 610 for configuring and controlling the cell base stations and the antenna groups associated with the cell base stations. The cell base stations 206, 208, 210, 212, 214 and 216 provide the initial control and power level settings for the respective antennas groups A-N. The antenna control system 614 may provide additional control to arbitrate the performance of the antennas connected to a respective cell base station 206, 208, 210, 212, 214 or 216. In one implementation, the antenna control system 614 may monitor transmit power of each antenna group A-N to determine whether a cell base station 206, 208, 210, 212, 214 or 216 should reduce the transmit power to its antennas so that the area covered by the radiation pattern of the cell base station's 206, 208, 210, 212, 214 or 216 antennas is reduced to prevent significant overlap with an area covered by the radiation patterns of an adjacent base station's 206, 208, 210, 212, 214 or 216 antennas and is capable of completing a cell phone 106 or 107 call handoff with the adjacent base station.

The telecommunications switching system 202 is also operatively connected to the aircraft central computer 240 to receive aircraft 102 speed, altitude, attitude and other navigation or global positioning information for use in detecting and tracking a cell phone 106 or 107 in the predetermined area in accordance with the present invention.

As discussed in further detail below, at least one of the cell base stations 206, 208, 210, 212, 214 and 216 is configured by the cell phone communication control computer system 602 to detect a registration request 650 from a cell phone 106 or 107 in the predetermined area 108. The cell base station receiving the registration request 650 sends, automatically or when polled, to the cell phone communication control computer system 602 a registration request message 652 that may include the subscriber's SID, a cell phone number, and a current location of the subscriber's cell phone (e.g., the detected cell phone 106 or 107). The cell phone communication control computer system 602 processes the registration request message 652 so a service provider associated with or typically providing service to the detected cell phone 106 or 107 receives an update of the current location of the detected cell phone 106 or 107. In one implementation, an emergency service is notified of the detected cell phone 106 or 107 via the PSTN 112. In addition, each cell base station 206, 208, 210, 212, 214 and 216 configured by the cell phone communication control computer system 602 in accordance with the present invention is operatively configured to receive a call request 660 or 670 from the detected cell phone 106 or 107 and transmit the call request in a message 662 or 672 for processing by either the air-to-air cell phone call server system 604 or the air-to-ground cell phone call server system 606 as described in further detail below. Similarly, the air-to-ground cell phone call server system 606 in accordance with the present invention is operatively configured to receive a call request from a phone 116 on the PSTN via a call request message 682 transmitted from the PSTN to the cell phone router 104 via the air-to-ground wideband communication interface 218 as discussed below.

Figure 7:
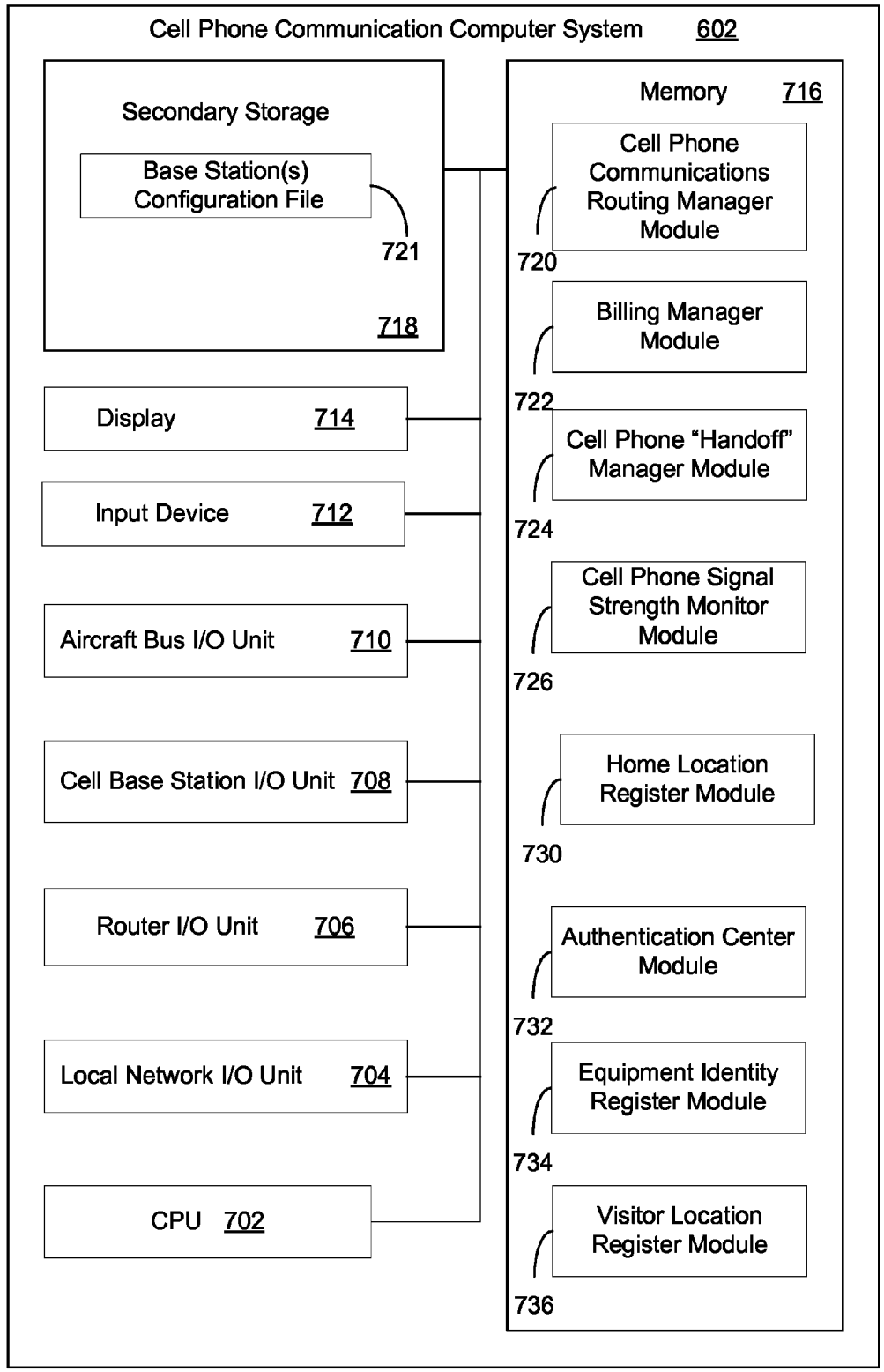
FIG. 7 depicts a block diagram of an exemplary cell phone communication control computer system of the telecommunications switching system consistent with the present invention.

FIG. 7 depicts an exemplary block diagram of the cell phone communication control computer system 602. As shown in FIG. 7, the cell phone communication control computer system 602 comprises: a central processing unit (CPU) 702; a local network I/O unit 704 for communicating with the air-to-air phone call server system 604 and the air-to-ground phone call server system 606 via the local network 607; a router I/O unit 706 for communicating with the base stations 206, 208, 210, 212, 214 or 216 via the router 608; a cell base station I/O unit 708 for communicating with the antenna control system 614; an aircraft bus I/O unit 710 for communicating with the aircraft central computer 240 or system having aircraft positioning information; an input device 712 such as a keyboard or mouse; a display 714; a memory 716; and a secondary storage device 718. These various components of the cell phone communications computer system 602 may be physically located remotely from each other and connected via a network such as the local network 607.

Memory 716 of the cell phone communication control computer system 602 stores a cell phone communications routing manager module or program 720 (the "routing manager"). The routing manager module 720 is configured to initialize the telecommunication system 202, configure the base stations 206, 208, 210, 212, 214 or 216 to provide communication access to cell phones 106 and 107 associated with one or more service providers in the predetermined area 108, detect a cell phone 106 and 107 in the predetermined area, and notify an emergency service or an associated Mobile Telephone Switching Office ("MTSO') of the detected cell phone's location and ID. In one implementation, the routing manager module 720 configures the base stations 206, 208, 210, 212, 214 or 216 in accordance with one or more base station configuration files 721 stored in secondary storage 718 as further discussed below.

Memory 716 of the cell phone communication control computer system 602 may also include a billings manager module 722. The billings manager module 722 is operatively configured to receive a recorded time associated with a call to/from a cell phone 106 or 107 in the predetermined area 108 and a phone number to be charged for the recorded time from the respective server (i.e., air-to-air cell phone call server system 604 or the air-to-ground cell phone call server system 606) that managed the call.

Memory 716 of the cell phone communication control computer system 602 may also a cell phone "handoff" manager module 724 and a cell phone signal strength monitor module 726. In one implementation in which a base station 206, 208, 210, 212, 214 or 216 does not have an antenna group A-N with coverage of one of the sectors 306, 308, 310, 312, 314 and 316, the cell phone "handoff" manager module 724 is operatively configured to transfer a call associated with a cell phone 106 or 107 moving to the one sector 306, 308, 310, 312, 314 or 316 from a current channel handled by the base station 206, 208, 210, 212, 214 or 216 without coverage of the one sector to another base station 206, 208, 210, 212, 214 or 216 having coverage of the one sector using standard cell communication channel handoff techniques. The cell phone "handoff" manager module 724 may determine that a handoff is required by monitoring the location of each cell phone 106 and 107 currently engaged in a respective call as reported or stored by the associated server handling the call (i.e., air-to-air cell phone call server system 604 or the air-to-ground cell phone call server system 606), determining the sector 306, 308, 310, 312, 314 or 316 corresponding to the location of each cell phone 106 and 107 and determining a next sector 306, 308, 310, 312, 314 or 316 that the cell phone 106 and 107 is moving towards. The cell phone "handoff" manager module 724 may determine that a handoff is required when either the cell phone 106 or 107 is within a predetermined distance from the next sector 306, 308, 310, 312, 314 or 316 or the signal strength associated of the cell phone 106 or 107 (as received by the antenna covering the one sector the cell phone 106 or 107 is currently located, for example, antenna 420A associated with base station 206 covering sector 306) is at or below a predetermined level. The cell phone "handoff" manager module 724 may identify the signal strength of the cell phone 106 or 107 via the cell phone signal strength monitor module 726 or via the respective cell base station 206, 208, 210, 212, 214 or 216 that is monitoring for registration request signals from the phone 106 or 107 or handling a call from the phone 106 or 107.

Memory 716 of the cell phone communication control computer system 602 also may include a home location register module 730 and an authentication center module 732. The home location register module 730 is operatively configured to maintain a home location register (HLR) 730A or 730N for each service provider supported by the cell base stations 206, 208, 210, 212, 214 and 216 on a respective database 612A-612N. Each HLR 730A-N includes subscriber information associated with each cell phone user that has subscribed to the service provider associated with the respective HLR 730A or 730N. The information associated with each cell phone user or subscriber and stored in each HLR 730A-N includes a subscriber ID (such as an International Mobile Subscriber Identity (IMSI) number), a cell phone number (such as a Mobile Subscriber ISDN number used by GSM/DCS cell phone networks), and a current location of the subscriber's cell phone (e.g., cell phone 106 or 107). Each HLR 730A-730N may also include other information about the services and features that the respective subscriber may access. Each HLR 730A-730N is initially provided or uploaded from the respective service provider for installation on a respective database 612A-612N associated with the cell phone communication control computer system 602 of the airborne cell phone router 104. In one implementation, each HLR 730A-730N is assigned a respective service provider ID (such as a Public Land Mobile Network (PLMN) number) so the home location register module 730 is able to identify and access the HLR 730A-730N associated with the respective service provider.

The authentication center module 732 is operatively configured to access an authentication center 732A or 732N associated with a respective service provider supported by one or more of the cell base stations 206, 208, 210, 212, 214 and 216 as configured by the cell phone communications routing module 720. Each authentication center 732A-732N may be uploaded to or stored on the database 612A or 612N in association with the HLR 730A or 730N associated with the respective service provider. Each authentication center 732A or 732N includes the authentication algorithms (such as the known A3 and A8 algorithms) associated with the respective service provider and a unique security key assigned to each subscriber by the respective service provider. In one implementation, the authentication center module 732 may authenticate a cell phone 106 or 107 user requesting communication access (e.g., a voice or text message call request) via the air-to-air cell phone call server system 604 or the air-to-ground cell phone call server system 606 by "challenging" the request using the algorithms and the security key assigned to the subscriber associated with the cell phone 106 or 107. For example, in one implementation, the authentication center module 732 may implement the known challenge technique to derive a signed response from the A3 algorithm using the security key assigned to the subscriber and a random number. The authentication center module 732, via the air-to-air cell phone call server system 604 or the air-to-ground cell phone call server system 606 handling the requesting cell phone 106 or 107, provides the cell phone 106 or 107 with the random number but not the security key and prompts the cell phone 106 or 107 to generate and return a corresponding signed answer from the same A3 algorithm. In this implementation, the authentication center module 732 then determines whether the signed response and the returned corresponding signed answer match and permits the requested communication access to proceed when it is determined that the signed response and the returned response match.

Memory 716 of the cell phone communication control computer system 602 also may include an equipment identity register module 734. The equipment identity register module 734 is operatively configured to maintain a equipment identity register (EIR) 734A on one of the databases 612A-612N. The EIR 734A includes a list of valid International Mobile Equipment Identity (IMEI) numbers assigned to cell phones (e.g., cell phones 106 and 107) by the phone's manufacturer to track the cell phone regardless of which service provider the cell phone is subscribed to. A valid IMEI number is one that has not been lost or stolen, and has been determined to be operational or functioning properly.

Memory 716 of the cell phone communication control computer system 602 also may include a visitor location register module 736. The visitor location register module 734 is operatively configured to maintain a visitor location register (VLR) 736A or 736N associated with a respective HLR 730A or 730N. In one implementation, once a cell phone 106 or 107 is detected in the predetermined region 108 or initiates a call request via the cell phone router 104 as discussed in further detail below, the cell phone communications routing manager module 720 causes the respective subscriber information (i.e., subscriber ID, a cell phone number, and current location of the subscriber's cell phone) associated with the cell phone 106 or 107 to be downloaded from the HLR 730A or 730N to the corresponding VLR 736A or 736N so the cell phone 106 or 107 may begin to use the services provided by the respective service provider. In one implementation, the VLR 736A or 736N is downloaded to the air-to-air cell phone call server system 604 or the air-to-ground cell phone call server system 606 handling the call request. In this implementation, the VLR 736A or 736N serves as a local cache for the corresponding HLR 730A or 730N subscriber information. Each VLR 736A or 736N may also maintain a register of cell phone 106 or 107 detected in the predetermined area 108 that is not subscribed to but is using a communication channel associated with a service provider supported by one of the base stations cell 206, 208, 210, 212, 214 and 216 as configured by the cell phone communications routing module 720. In conventional ground based MTSO networks, the cell phone 106 or 107 requesting access to a communication channel in a cell operated by a service provider that is not the provider to which the cell phone 106 or 107 is commonly referenced as a "roaming" cell phone 106 or 107. In this implementation, the cell phone communications routing manager module 720 is operatively configured to authenticate a roaming cell phone 106 or 107 by accessing, via the PSTN 112, an MTSO to whom the roaming cell 106 or 107 is subscribed or from whom it receives wireless communication access.

Figure 8:
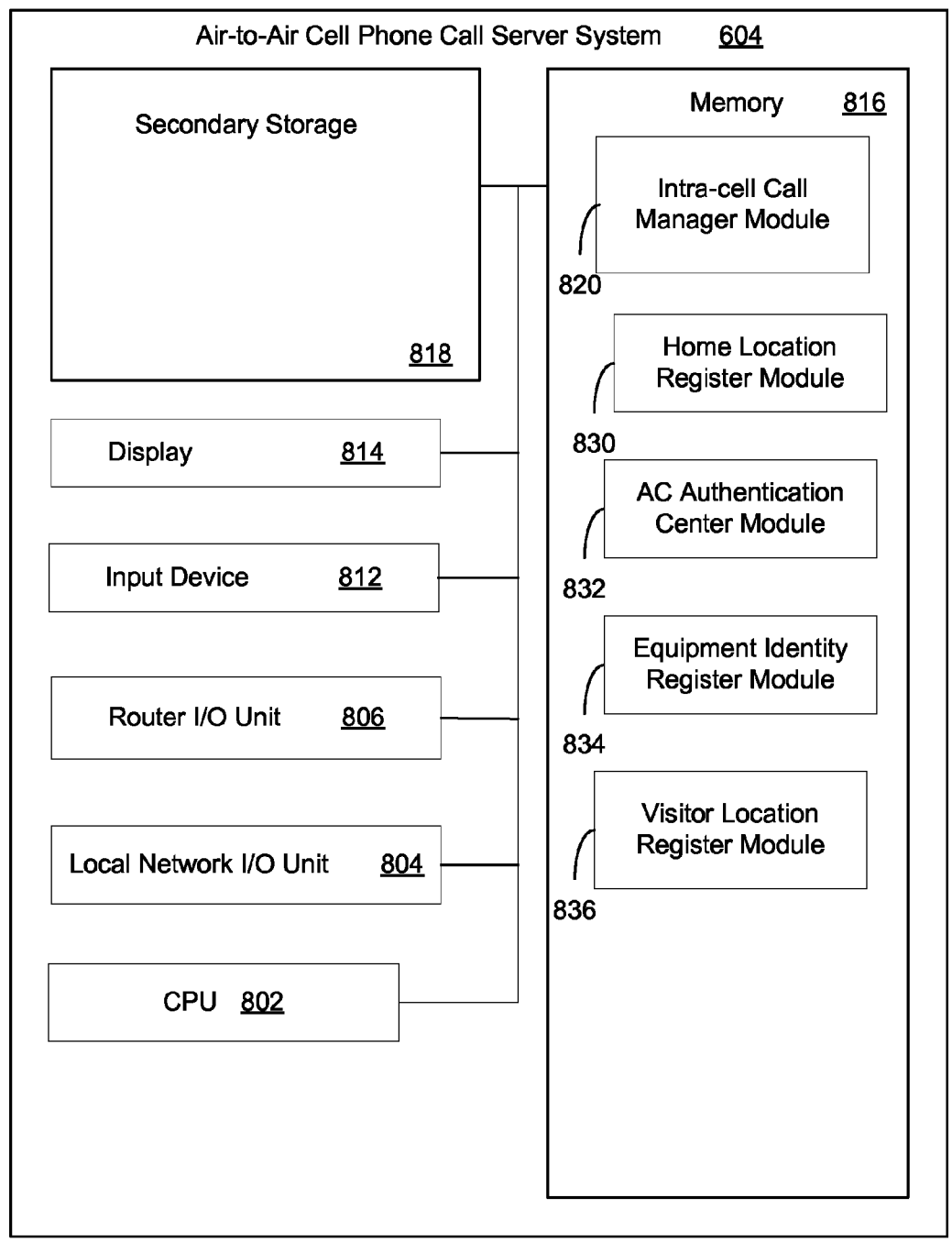
FIG. 8 depicts a block diagram of an exemplary air-to-air cell phone call server system of the telecommunications switching system consistent with the present invention.

FIG. 8 depicts an exemplary block diagram of the air-to-air cell phone call server system 604. As shown in FIG. 8, the air-to-air cell phone call server system 604 comprises: a central processing unit (CPU) 802; a local network I/O unit 804 for communicating with the cell phone communication control computer system 602 and the air-to-ground phone call server system 606 via the local network 607; a router I/O unit 806 for communicating with the base stations 206, 208, 210, 212, 214 or 216 via the router 608; an input device 812 such as a keyboard or mouse; a display 814; a memory 816; and a secondary storage device 818. These various components of the air-to-air cell phone call server system 604 may be physically located remote from each other and connected via a network such as the local network 607.

Memory 816 of the air-to-air cell phone call server system 604 includes an intra-cell call manager module or program 820. The intra-cell call manager module 820 is configured to respond to and manage a call request received by a cell base station 206, 208, 210, 212, 214 or 216 from one cell phone 106 in the predetermined area 108 to another cell phone 107 in the predetermined area 108 as discussed in detail below.

In one implementation, memory 816 of the air-to-air cell phone call server system 604 also may include a home location register module 830, an authentication center module 832, an equipment identity register module 834, and a visitor location register module 836 each of which is consistent with the module of the same name in the cell phone communication control computer system 602. In this implementation, the home location register module 830, the authentication center module 832, the equipment identity register module 834, and the visitor location register module 836 allow the intra-cell call manager module 820 to have local access to subscriber information stored in each HLR 730A-730N, each authentication center 732A-732N, the equipment identity register 734A, and each VLR 736A-736N for managing a call between two cell phones 106 and 107 in the predetermined area 108.

Figure 9:
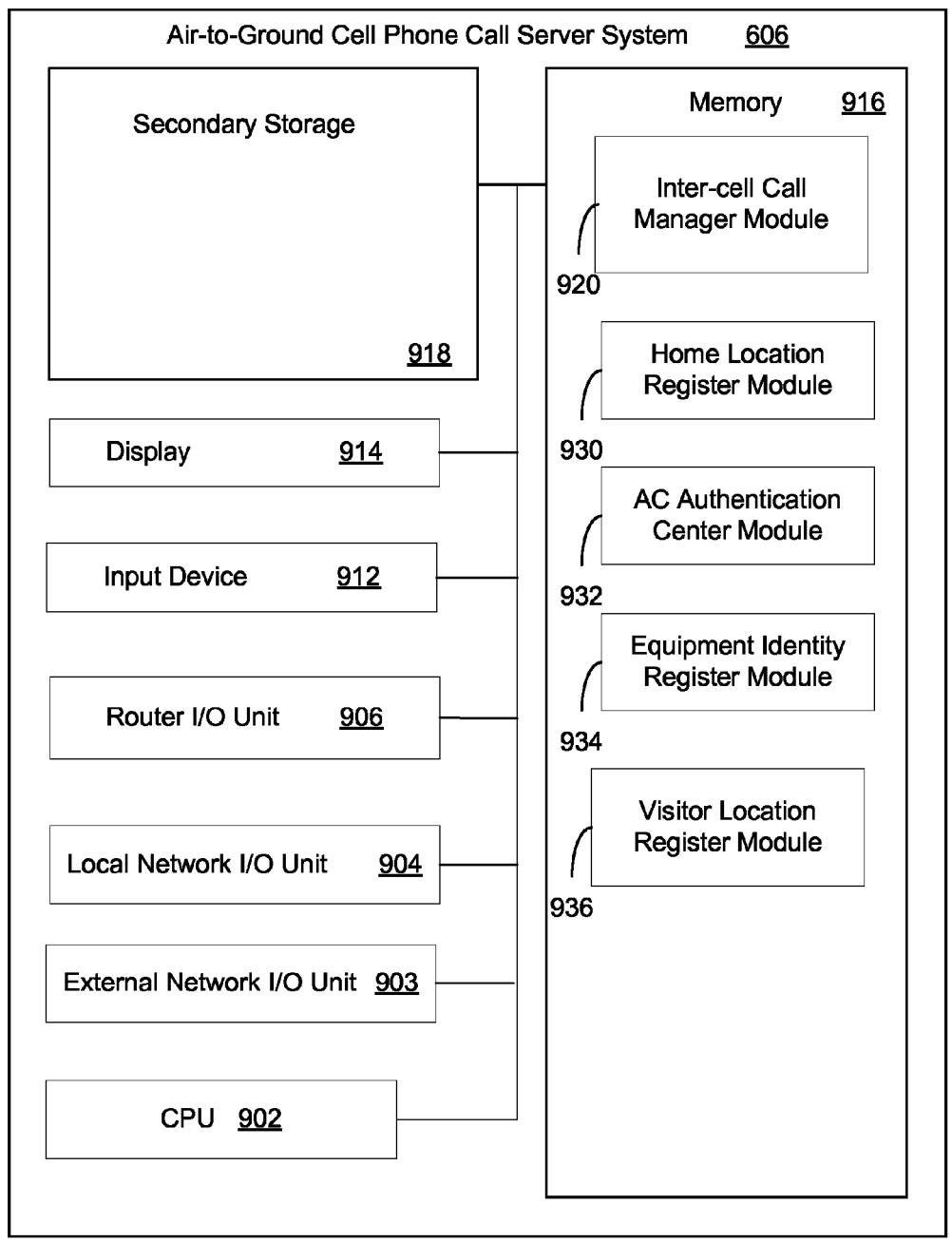
FIG. 9 depicts a block diagram of an exemplary air-to-ground cell phone call server system of the telecommunications switching system consistent with the present invention.

FIG. 9 depicts an exemplary block diagram of the air-to-ground cell phone call server system 606. As shown in FIG. 9, the air-to-ground cell phone call server system 606 comprises: a central processing unit (CPU) 902; an external network I/O unit 903 for communicating with the air-to-ground wideband communication interface 218; a local network I/O unit 904 for communicating with the cell phone communication control computer system 602 and the air-to-air phone call server system 604 via the local network 607; a router I/O unit 906 for communicating with the base stations 206, 208, 210, 212, 214 or 216 via the router 608; an input device 912 such as a keyboard or mouse; a display 914; a memory 916; and a secondary storage device 918. These various components of the air-to-ground cell phone call server system 606 may be physically located remotely from each other and connected via a network such as the local network 607.

Memory 916 of the air-to-ground cell phone call server system 606 includes an inter-cell call manager module or program 920. As discussed in further detail below, the inter-cell call manager module 920 is configured to respond to and manage a call request received by a cell base station 206, 208, 210, 212, 214 or 216 from one cell phone 106 in the predetermined area 108 to another phone 116 (e.g., a cell phone or a PSTN phone) via the PSTN 112 and vice versa.

In one implementation, memory 916 of the air-to-ground cell phone call server system 606 also may include a home location register module 930, an authentication center module 932, an equipment identity register module 934, and a visitor location register module 936 each of which is consistent with the module of the same name in the cell phone communication control computer system 602. In this implementation, the home location register module 930, the authentication center module 932, the equipment identity register module 934, and the visitor location register module 936 allow the intra-cell call manager module 920 to have local access to subscriber information stored in each HLR 730A-730N, each authentication center 732A-732N, the equipment identity register 734A, and each VLR 736A-736N for managing a call between a cell phone 106 or 107 in the predetermined area 108 and another phone 116 via the PSTN 112.

In addition, although aspects of one implementation shown in FIGS. 6-9 are depicted as being stored in memory, one skilled in the art will appreciate that all or part of systems and methods consistent with the present invention may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of the cell phone communication routing system 100 and the cell phone router 104 have been described, one skilled in the art will appreciate that a cell phone communication routing system and an airborne cell phone router suitable for use with methods, systems, and articles of manufacture consistent with the present invention may contain additional or different components.

Figure 10A:
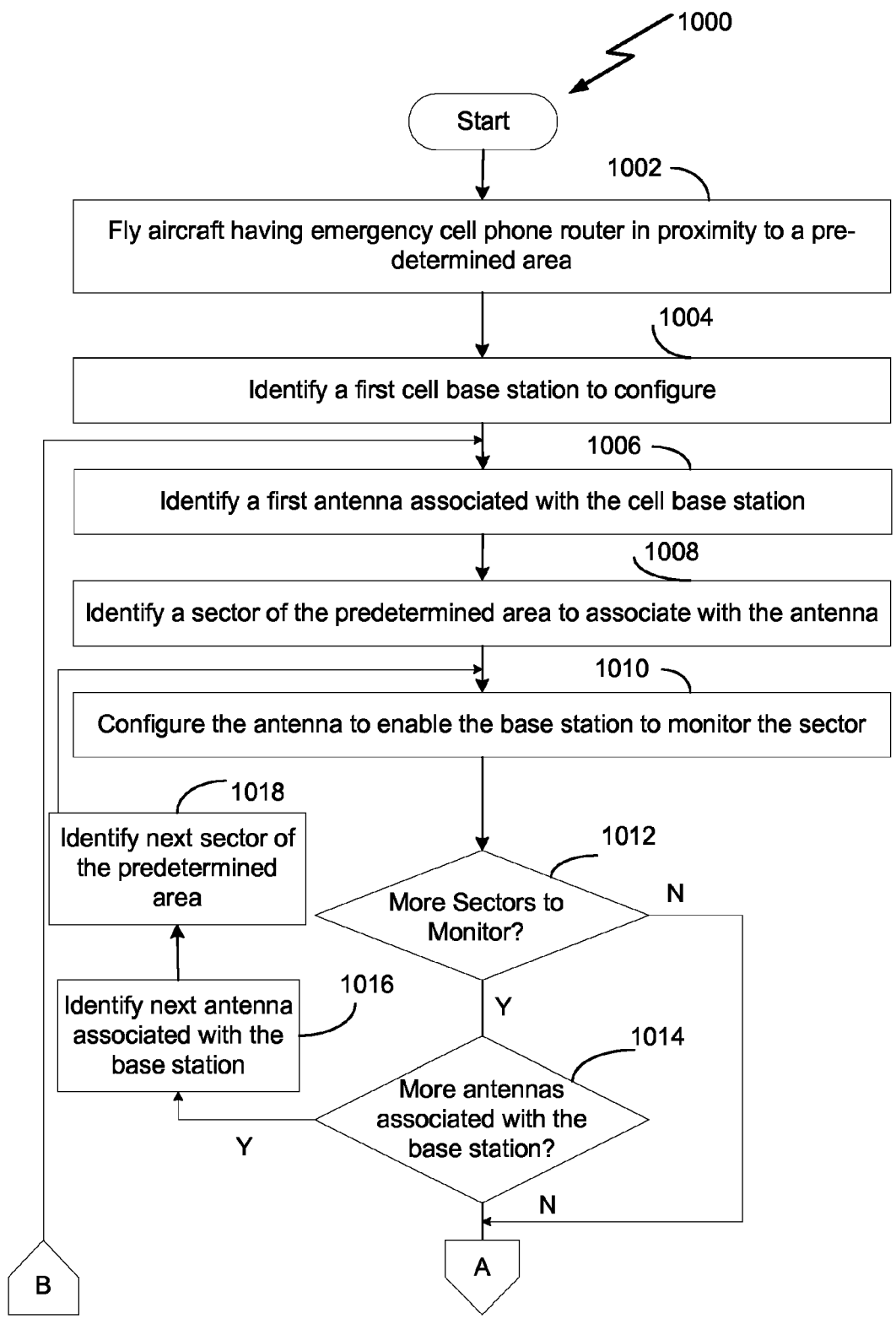

FIGS. 10A-B depict a flow diagram of an exemplary process 1000 performed by the routing manager 720 of the cell phone router 104 to configure the cell base stations 206, 208, 210, 212, 214 or 216 to monitor for a cell phone 106 or 107 in the predetermined area 108. Initially, as a preprocessing step, the aircraft 102 having the emergency cell phone router 104 is flown in proximity to the pre-determined area 108 (step 1002). The routing manager 720 then identifies a first cell base station to configure (step 1004). In one implementation, an operator using the input device 712 may identify the first cell base station (e.g., base station 206) to the routing manager 720 via a user interface (not shown in the figures) provided by the routing manager 720 on the display 714. Alternatively, the routing manager 720 may access the configuration file 721, upon startup or when in proximity of the predetermined area 108, to identify the first base station to configure. In one implementation, the first base station 206 may be the initial base station named in the configuration file, where the identifier of the initial base station is set off by respective beginning and ending tags or delimiters recognizable by the routing manager 720, such as follows in the exemplary excerpt (1) of the configuration file 721:

<base station config><base station name>station 206</base station name> . . . <\base station config>    (1), where <base station config> and <\base station config> identify the beginning and end, respectively, of a base station configuration segment and <base station name> and </base station name> are beginning and ending tags, respectively, for the base station identifier.

The routing manager 720 then identifies a first antenna associated with the cell base station (step 1006). An operator using the input device 712 may identify the first antenna (e.g., antenna 402A of antenna group A of base station 206) to the routing manager 720 via a user interface (not shown in the figures) provided by the routing manager 720 on the display 714. Alternatively, the routing manager 720 may access the configuration file 721 to identify the first antenna 402A associated with the first base station 206 to configure. For example, the first antenna 402A may be the initial antenna following the identified base station in the configuration file 721, where the identifier of the first antenna 402 is set off by respective beginning and ending tags or delimiters recognizable by the routing manager 720, such as follows in the exemplary excerpt (2) of the configuration file 721:

<base station config><base station ID>station 206</
base station ID><antenna ID>antenna
402A<\antenna ID> . . . <\base station config>  (2).

Next, the routing manager 720 identifies a sector 306, 308, 310, 312, 314, and 316 of the predetermined area 108 to associate with the antenna (step 1008). An operator using the input device 712 may identify the sector (e.g., sector 316) to the routing manager 720 via a user interface (not shown in the figures) provided by the routing manager 720 on the display 714. Alternatively, the routing manager 720 may access the configuration file 721 to identify the sector 316 to associate with the identified first antenna 402. In one implementation, the sector associated with the identified antenna is the sector identified after the respective antenna the configuration file 721, where the identifier of the sector is set off by respective beginning and ending tags or delimiters recognizable by the routing manager 720, such as follows in the exemplary excerpt (3) of the configuration file 721:

<base station config><base station ID>station 206
</base station ID><antenna ID>antenna
402A<\antenna ID><sector>316<\sector> . . .
<\base station config>  (3).

The routing manager 720 then configures the identified antenna (e.g., antenna 402) to enable the identified base station (e.g., base station 206) to monitor the sector (step 1010). In one implementation, the routing manager 720 may derive a look angle and antenna power level for the identified antenna based on the identified sector and a current altitude and position of the aircraft. Alternatively, an operator using the input device 712 may provide a look angle and antenna power level for the identified antenna to the routing manager 720 or the routing manager 720 may access the configuration file 721 to identify the look angle, antenna power level, and other antenna parameters to associate with the identified antenna.

Next, the routing manager 720 determines whether there are more sectors to monitor (step 1012). If there are no more sectors to monitor, the routing manager continues processing at step 1020. If there are more sectors to monitor, the routing manager 720 determines whether there are more antennas associated with the identified base station (step 1014). In one implementation, the routing manager 720 determines that there are no more antennas associated with identified base station when the routing manager 720 reaches the end tag or delimiter for the identified base station's configuration definition (e.g., <\base station config>). If there are no more antennas associated with the identified base station, the routing manager 720 continues processing at step 1020. If there are more antennas associated with the identified base station, the identifies the next antenna associated with the base station (step 1016) and identifies the next sector of the predetermined area (step 1018) from the operator or the configuration file 721 before continuing processing at step 1010.

After determining there are no more sectors to monitor or there are no more antennas associated with the identified base station, the routing manager 720 identifies a first service provider to associate with the identified base station (step 1020). An operator using the input device 712 may identify the first service provider (e.g., T-Mobile) to the routing manager 720 via a user interface (not shown in the figures) provided by the routing manager 720 on the display 714. Alternatively, the routing manager 720 may access the configuration file 721 to identify the first service provider to associate with the identified base station. In one implementation, an identifier for the first service provider is provided within the identified base station's configuration definition (e.g., between beginning delimiter "<base station config>" and end delimiter "<\base station config>") and set off by respective beginning and ending tags or delimiters for a service provider identification (e.g., a name or associated SID), such as follows in the exemplary excerpt (4) of the configuration file 721:

<base station config> . . . <service provider ID>T-
Mobile<\service provider> . . . <\base station
config>  (4).

The routing manager 720 then receives a set of cell phone frequencies associated with the service provider (step 1022). The cell phone frequencies may correspond to a band width of the cell phone spectrum (e.g., 824-894 MHz, 900 MHz band, 1800 MHz band, or 1900 MHz band) allotted by the FCC to the identified service provider. As discussed below, the cell phone router 104, via the air-to-air cell phone call server system 604 or air-to-ground cell phone call server system 606, assigns a frequency pair (i.e., a transmit channel and a receive channel) from the identified service provider's allocated band width of frequencies to a cell phone 106 or 107 in the predetermined area 108 to allow a call to or from the cell phone 106 or 107. In one implementation, an operator using the input device 712 may identify a set of cell phone frequencies associated with the identified service provider to the routing manager 720 via a user interface (not shown in the figures) provided by the routing manager 720 on the display 714. Alternatively, the routing manager 720 may access the configuration file 721 to identify the set of cell phone frequencies associated with the service provider, which may follow the service provider identification within the identified base station's configuration definition, such as in the following exemplary excerpt (5) of the configuration file 721:

<base station config> . . . <service provider ID>T-
Mobile<\service provider><service provider
freq>824-830<\service provider freq> . . . <\base
station config>  (5).

The routing manager 720 then configures the identified base station (e.g., base station 206) to monitor a registration request from a cell phone (e.g., cell phone 106) associated with the service provider via each configured antenna associated with the base station (step 1024). A cell phone 106 or 107 implemented in accordance with known cell phone protocols (e.g., IS-136, Interm Standard 95 (or IS-95/JS-008), Enhanced Specialized Mobile Radio standard, or North America GSM standard) is operatively configured to transmit a registration request message upon power up so a nearby base station tower or closest base station tower to the cell phone associated with a service provider's MTSO may respond to the registration request. In accordance with the present invention, when a service provider's base station tower is not present in the predetermined area or is not operative, the airborne cell phone router is operatively configured to detect and respond to a registration request from a cell phone 106 or 107 in the predetermined area 108.

Next, the routing manager 720 determines whether there are more service providers to associate with the identified base station. In one implementation, an operator using input device 712 may inform the routing manager 720 that no more service providers are to be associated with the identified base station (e.g., base station 206). Alternatively, the routing manager 720 may complete parsing the identified base station's configuration definition in the configuration file 721 to determine that no more service providers are identified in association with the respective base station (e.g., base station 206).

The routing manager 720 then determines whether the base station can handle another service provider (step 1028). In one implementation, the routing manager 720 is operatively configured to recognize that the identified base station is capable of handling a predetermined number of carriers or service providers. If it is determined that the identified base station can handle another service provider, the routing manager 720 identifies the next service provider to associate with the base station (step 1030) and continues processing at step 1022. If it is determined that the identified base station cannot handle another service provider, the routing manager 720 then determines whether there are more cell base stations available to be configured (step 1032). If it is determined that there are more cell base stations (e.g., stations 208, 210, 212, 214 or 216), the routing manager 702 identifies a next cell base station to configure (step 1034) and continues processing at step 1006.

If there are no more service providers to associate with the identified base station or if there are no more base stations to configure, the routing manager ends processing.

FIG. 11 depicts a flow diagram of an exemplary process 1100 performed by the routing manager 720 of the cell phone router 104 to detect a cell phone 106 or 107 in the predetermined area 108. Initially, the routing manager 720 determines whether a registration request from a cell phone 106 or 107 has been received (step 1102). In the implementation depicted in FIG. 6, the cell base station 206 receives the registration request 650 from a cell phone 106 or 107 in the predetermined area 108 and sends a corresponding registration request message 652 to the cell phone communications control computer system 602 where the routing manager 720 resides. In the implementation shown in FIG. 11, the routing manager 720 continues to process step 1102 until a registration request 650 from a cell phone 106 or 107 in the predetermined area is detected. However, the routing manager 720 may be a multi-threaded application such that the routing manager 720 may accomplish other tasks while waiting for a registration request to be received at step 1102.

If a registration request has been received, the routing manager 720 receives a SID for a service provider that is associated with the registration request (step 1104) and an ID associated with the cell phone (e.g., electronic serial number assigned to the cell phone) (step 1106). The routing manager 720 then identifies the location of the cell phone (step 1108). In one implementation in which the cell phone 106 or 107 transmitting the registration request 650 has a global positioning system (not shown in figures), the routing manager 720 may receive the location from the respective cell phone 106 and 107 as part of the registration request message 650 or subsequent message. Alternatively, the routing manager 720 may use any standard cell phone location identification techniques, such as deriving the location of the cell phone 106 or 107 based on a handoff location (e.g., sector border location) between a first cell base station antenna (e.g., antenna group 226A) handling communication with the cell phone 106 in a first sector (e.g., sector 306) to a second cell base station antenna (e.g., antenna group 228A) handling communication in an adjacent sector 308 of the predetermined area 108.

Next, the routing manager 720 stores the cell phone ID and location in a database for the service provider associated with the registration request (step 1110). For example, based on the SID provided in the registration request message 652, the routing manager 720 may determine that the HLR 732 and the VLR 736 are associated with the service provider having the SID in the registration request message 652 and store the received cell phone ID and location of the detected phone 106 or 107 in the associated VLR 734 or HLR 732. The routing manager 720 may then provide, via the PSTN 112, the cell phone ID and location to the Mobile Telephone Switching Office associated with the service provider (step 1112).

Figure 15:
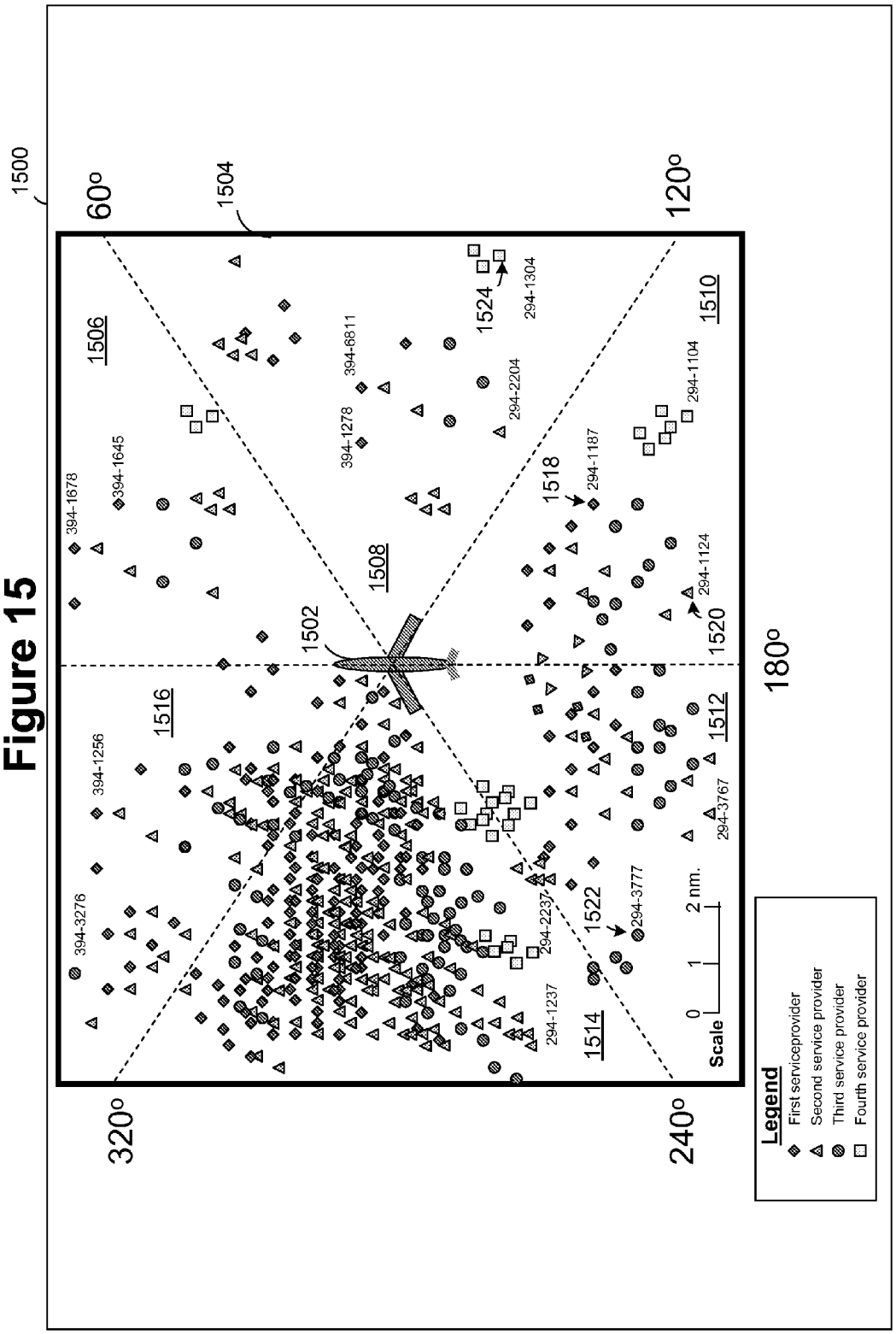
FIG. 15 depicts an exemplary user interface generated by a routing manager of the cell phone router to display a graphical representation of a detected cell phone's location within the predetermined area.

The routing manager 720 also displays a graphical representation of the respective location of each detected cell phone within the predetermined area 108 monitored by the cell phone router 104 (step 1113) to assist an operator in visualizing where the detected cell phone is located relative to the air vehicle 102. FIG. 15 depicts an exemplary user interface 1500 generated by the routing manager 720 to display a graphical representation of the location of each detected cell phone within the predetermined area 108. In the implementation shown in FIG. 15, the routing manager 720 displays a first symbol (e.g., an air vehicle icon 1502) relative to a first region 1504 of the user interface 1500 to reflect the position of the air vehicle 102 relative to the predetermined area 108. The routing manager 720 also graphically represents each sector 306, 308, 310, 312, 314, or 316 of the predetermined area 108 as a corresponding sub-region 1506, 1508, 1510, 1512, 1514 and 1516 of the first region 1504, depicting the predetermined area 108. Each detected cell phone 106 or 107 is graphically represented by the routing manager 720 as a respective icon (e.g., 1518, 1520, 1522, or 1524) that reflects the location of the respective cell phone 106 within the respective sector 306, 308, 310, 312, 314, or 316 (e.g., graphically represented as sub-regions 1506, 1508, 1510, 1512, 1514 and 1516) of the predetermined area 108. As shown in FIG. 15, the shape, color, or other aspect of each icon 1518, 1520, 1522, and 1524 may be used by the routing manager 720 to identify the respective service provider associated with each detected cell phone 106 or 107. In addition, the routing manager 720 may display the cell phone ID of the detected cell phone 106 or 107 in association with the respective icon of the detected cell phone (e.g., phone number "294-1187" associated with icon 1518 representing a detected cell phone 106 or 107 in the sector 310 of the predetermined area 108). Accordingly, the routing manager 720 allows an operator viewing the user interface 1500 on the display 714 of the cell phone communication computer system 602 to easily identify the location of each detected cell phone 106 or 107 in the predetermined area 108 in relation to the air vehicle 102 and to identify the service provider and cell phone ID associated with each detected cell phone 106 or 107.

Returning to FIG. 11, the routing manager 720 may also determine whether to call an emergency service to alert the service of the detected cell phone 106 or 107 (step 1114). If it is determined that an emergency service is to be called, the routing manager 720 provides emergency services with the cell phone ID and location of the detected cell phone 106 and 107 (step 1116). The routing manager 720 may be operatively configured (for example, via the configuration file 721) to automatically call an emergency service, such as a local police or Red Cross center, when a cell phone 106 or 107 is detected in the predetermined area 108. The capability by the cell phone router 104 to automatic notify an emergency service of the detected cell phone 106 or 107 allows for a quick response to aid a cell phone user in an area 108 where no base station towers may be operational.

If it is determined that an emergency service is not to be called or after providing the emergency service with the cell phone ID and location of the detected cell phone 106 or 107, the routing manager 720 determines whether to check for more registration requests (step 1118). If it is determined to check for more registration requests, the routing manager 720 continues processing at step 1102; otherwise, the routing manager 720 ends processing.

FIG. 12 depicts a flow diagram of an exemplary process 1200 performed by the intra-cell call manager module 820 of the cell phone router 104 for handling a call request 660 from one cell phone 106 or 107 within the predetermined area to another cell phone within the same predetermined area 107 or 106. As shown in FIG. 12, the intra-cell call manager 820 initially determines whether a call request from a cell phone (e.g., phone 106) in the predetermined area 108 has been received (step 1202). As previously noted, a cell phone 106 or 107 in the predetermined area may transmit a call request 660 or 670 to a cell base station 206, 208, 210, 212, 214, or 216 configured to support communication access for each cell phone 106 and 107 associated with a respective service provider. In one implementation, each cell base station 206, 208, 210, 212, 214, and 216 may be operatively configured to transmit the call request 660 or 670 in a message 662 or 672 sent to either one or both the air-to-air cell phone call server system 604 or the air-to-ground cell phone call server system 606 for processing. The call request message 662 or 672 includes a destination phone number and information associated with the requesting cell phone 106 or 107, such as the subscriber ID, the cell phone number, and the current location of the requesting cell phone 106 or 107, which typically is transmitted by a standard cell phone when operated by a user to initiate a call. Thus, in one implementation, the cell base station 206, 208, 210, 212, 214, and 216 generates the call request message 662 or 672 based on the call request 660 or 670 but need not determine whether the phone associated with the destination phone number is in the predetermined area 108 or on the PSTN 112. In this implementation, the air-to-air cell phone call server system 604 and the air-to-ground cell phone call server system 606 may both receive the call request message 662 or 672 from the respective cell base station 206, 208, 210, 212, 214, and 216 for further processing as discussed herein.

Next, the intra-cell call manager 820 determines whether the call request 660 or 670 is to another cell phone (e.g., phone 107) in the predetermined area 108 (step 1204). The intra-cell call manager 820 parses the call request message 662 or 672 to identify the associated destination cell number and then searches the HLR 730A-730N or the VLR 736A-736N associated with the service provider corresponding to the call request 660 or 670 (and also identified in the call request message 662 or 672) to determine whether the cell phone 107 associated with the destination phone number is in the predetermined area 108.

If the call request is not to another cell phone in the predetermined area 108, the intra-cell call manager 820 continues processing at step 1202, allowing the inter-cell call manager 920 of the ground-to-air cell phone call server system 606 to handle this call request. If the call request is to another cell phone in the predetermined area 108, the intra-cell call manager 820 assigns a voice channel or voice channel pair (e.g., a transmit channel and a receive channel) to the requesting cell phone 106 via the control channel upon which the call request 660 or 670 was received in accordance with the frequency band assigned to the service provider associated with the requesting cell phone 106 (step 1206). The intra-cell call manager 820 may, in this step, assign the voice channel or voice channel pair to the requesting cell phone by submitting a corresponding message (not shown in figures) to the base station 206, 208, 210, 212, 214, or 216 that received the call request 660 and 670.

In accordance with standard cell phone communication protocols or signaling techniques, the intra-cell call manager 820 may then transmit a Supervisory Audio Tone (SAT) or equivalent to the requesting cell phone on the assigned voice channel or transmit channel (step 1208). The intra-cell call manager 820 may then determine whether a response to the transmitted SAT has been received on the assigned voice channel or receive channel (step 1210). A SAT transmission may be applicable for each cell phone 106 or 107 configured to operate in a Advanced Mobile Phone System (AMPS) cellular network. An equivalent communication confirmation or verification signal may be used for other types of cellular networks; however, for brevity in the description, the transmitted SAT shall include or also refer to equivalent communication confirmation or verification signals used in other types of cellular networks.

If no response to the transmitted SAT has been received, the intra-cell call manager 820 may retransmit the SAT or continue processing at step 1202. If a response to the transmitted SAT has been received, the intra-cell call manager 820 transmits, via the base station 206, 208, 210, 212, 214, or 216 that received the call request 660 and 670, a ring signal to the requesting cell phone (step 1212) in accordance with standard cell phone communication protocols or techniques.

Next, the intra-cell call manager 820 retrieves the destination cell phone's (e.g., cell phone 107) location and phone number (step 1214). In one implementation, the intra-cell call manager 820 retrieves the destination cell phone's (e.g., cell phone 107) location and phone number from the HLR 730A-730N or the VLR 736A-736N associated with the service provider corresponding to the call request 660 or 670. The intra-cell call manager 820 then configures or commands a base station 206, 208, 210, 212, 214, or 216 and associated antenna to track the destination cell phone 107 based on the cell phone's location (step 1216). The base station 206, 208, 210, 212, 214, or 216 configured or commanded to track the destination cell phone 107 may be the same base station 206, 208, 210, 212, 214, or 216 associated with the service provider corresponding to the call request 660 or 670 or another base station 206, 208, 210, 212, 214, or 216 having an antenna monitoring the sector of the predetermined area 108 where the destination cell phone 107 is currently located.

The intra-cell call manager 820 then pages the destination cell phone 107 on a control channel associated with the base station 206, 208, 210, 212, 214, or 216 configured to track the destination cell phone 107 (step 1218) and determines whether a response to the page received has been received (step 1220).

If no response to page has been received, the intra-cell call manager 820 may retransmit the page or continue processing at step 1202. If a response to the page has been received, the intra-cell call manager 820 sends the assigned voice channel or voice channel pair to the destination cell phone 107 via a control channel of the base station 206, 208, 210, 212, 214, or 216 configured to track the destination cell phone 107 (step 1222). The intra-cell call manager 820 next transmits a ring signal to the destination cell phone 107 (step 1224) in accordance with standard cell phone communication protocols or techniques.

The intra-cell call manager 820 receives an answer to the ring signal and, in response, routes voice transmission between the two cell phones 106 and 107 in the predetermined area 108 on the assigned voice channel or channel pair (step 1226) in accordance with standard cell phone communication protocols or techniques.

The intra-cell call manager 820 may be a threaded application capable of handling or managing multiple call requests 660 and 670 substantially simultaneously or in parallel. Accordingly, the intra-cell call manager 820 next determines whether to check for more call requests (step 1228). If it is determined to check for more call requests, the intra-cell call manager 820 continues processing at step 1202; otherwise, the intra-cell call manager 820 ends processing.

Figure 13B:
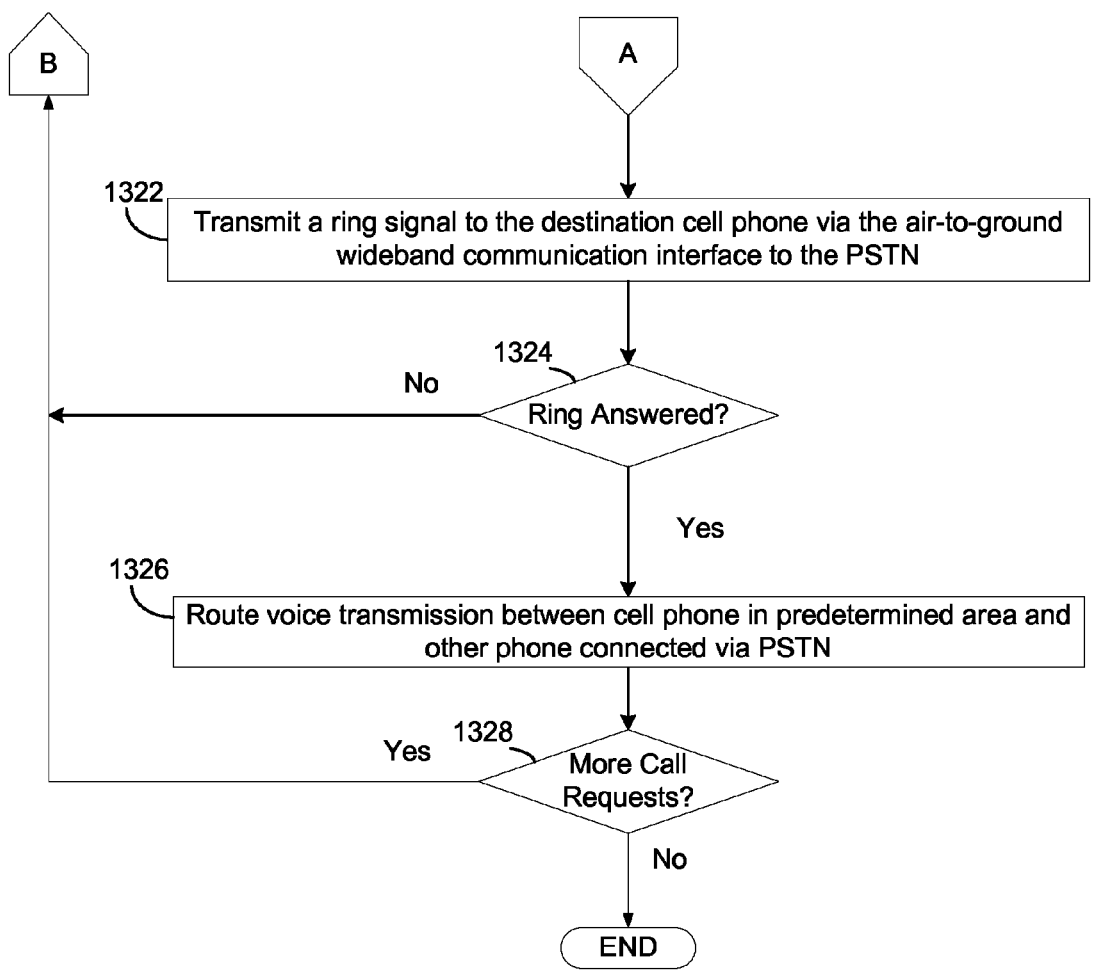

FIGS. 13A-B depict a flow diagram of an exemplary process 1300 performed by the inter-cell call manager 920 cell phone router for handling a call request 660 or 670 from a cell phone 106 or 107 within the predetermined area 108 to another phone 116 on the PSTN 112. As shown in FIG. 13A, the inter-cell call manager 920 initially determines whether a call request 660 or 670 from a cell phone (e.g., phone 106) in the predetermined area 108 has been received (step 1302). In one implementation, the inter-cell call manager 920 may determine that a call request 660 or 670 has been received when one of the base stations 206, 208, 210, 212, 214, or 216 provides the air-to-ground cell phone call server system 606, in which the inter-cell call manager 920 resides, with a call request message 662 or 672.

Next, the inter-cell call manager 920 determines whether the call request 660 or 670 is to another cell phone (e.g., phone 116) outside the predetermined area 108 or on the PSTN (step 1304). The inter-cell call manager 920 is operatively configured to parse the call request message 662 or 672 to identify the associated destination cell number and then search the HLR 730A-730N or the VLR 736A-736N associated with the service provider corresponding to the call request 660 or 670 (and also identified in the call request message 662 or 672) to determine whether the cell phone 116 associated with the destination phone number is in the predetermined area 108.

If the call request is to another cell phone (e.g., 107) in the predetermined area 108, the inter-cell call manager 920 continues processing at step 1302, allowing the intra-cell call manager 820 of the air-to-air cell phone call server system 604 to handle this call request. If the call request is not to another cell phone in the predetermined area 108, the inter-cell call manager 920 sends the call request message 662 or 672 having the destination phone number to the PSTN 112 via the air-to-ground wideband communication interface 218 for access verification (step 1306). As would be understood by those of ordinary skill in the telecommunication art having the present specification before them, the PSTN 112 is able to direct a call request to the phone 116 having the destination phone number via public telephone lines and/or (when the phone 116 is a cell phone having a subscriber SID) via wireless branches of an MTSO associated with the service provider assigned the SID and that customarily provides access to the cell phone 116.

Next, the inter-cell call manager 920 determines whether communication access to the other cell phone 116 outside the predetermined area 108 will be allowed via the PSTN 112 (step 1308). The inter-cell call manager 920 may determine that communication access is allowed if the PSTN 112 responds within a predetermined period to the call request message 662 or 672 forwarded by the inter-cell call manager 920 to the PSTN 112.

If communication access is not allowed, the inter-cell call manager 920 may send a busy tone to the requesting cell phone 106 in the predetermined area 108 before continuing processing at step 1302. If communication access is allowed, the inter-cell call manager 920 assigns a voice channel or voice channel pair (e.g., a transmit channel and a receive channel) to the requesting cell phone 106 via the control channel upon which the call request 660 or 670 was received in accordance with the frequency band assigned to the service provider associated with the requesting cell phone 106 (step 1310). The inter-cell call manager 920 may, in this step, assign the voice channel or voice channel pair to the requesting cell phone by submitting a corresponding message (not shown in figures) to the base station 206, 208, 210, 212, 214, or 216 that received the call request 660 and 670.

The inter-cell call manager 920 may then transmit a SAT tone or equivalent to the requesting cell phone 106 on the assigned voice channel or transmit channel (step 1312). The inter-cell call manager 920 may then determine whether a response to the transmitted SAT has been received on the assigned voice channel or receive channel (step 1314).

If no response to the transmitted SAT has been received, the inter-cell call manager 920 may retransmit the SAT or continue processing at step 1302. If a response to the transmitted SAT has been received, the inter-cell call manager 920 transmits, via the base station 206, 208, 210, 212, 214, or 216 that received the call request 660 and 670, a ring signal to the requesting cell phone (step 1316) in accordance with standard cell phone communication protocols or techniques.

Next, the inter-cell call manager 920 establishes a control channel connection to the destination cell phone 116 via the air-to-ground wideband communication interface 218 to the PSTN 112 (step 1318). The inter-cell call manager 920 then sends the assigned voice channel or voice channel pair to the destination cell phone 116 on the control channel connection via the air-to-ground wideband communication interface 218 to the PSTN 112 (step 1320). The intra-cell call manager 920 then transmits a ring signal to the destination cell phone 114 via the air-to-ground wideband communication interface 218 and the PSTN 112 (step 1322), and determines whether a response or answer to the ring signal has been received (step 1324).

If no response to the ring signal has been received from the destination cell phone 116, the inter-cell call manager 920 may retransmit the ring signal or continue processing at step 1302. If a response to the ring signal has been received, the inter-cell call manager 920 routes voice transmission between the requesting cell phone 106 in the predetermined area 108 and the destination cell phone 116 on the PSTN 116 (step 1226) in accordance with standard cell phone communication protocols or techniques.

The inter-cell call manager 920 may be a threaded application capable of handling or managing multiple call requests 660 and 670 in substantially simultaneously or in parallel. Accordingly, the inter-cell call manager 920 next determines whether to check for more call requests (step 1328). If it is determined to check for more call requests, the inter-cell call manager 920 continues processing at step 1302; otherwise, the inter-cell call manager 920 ends processing.

Figure 14B:
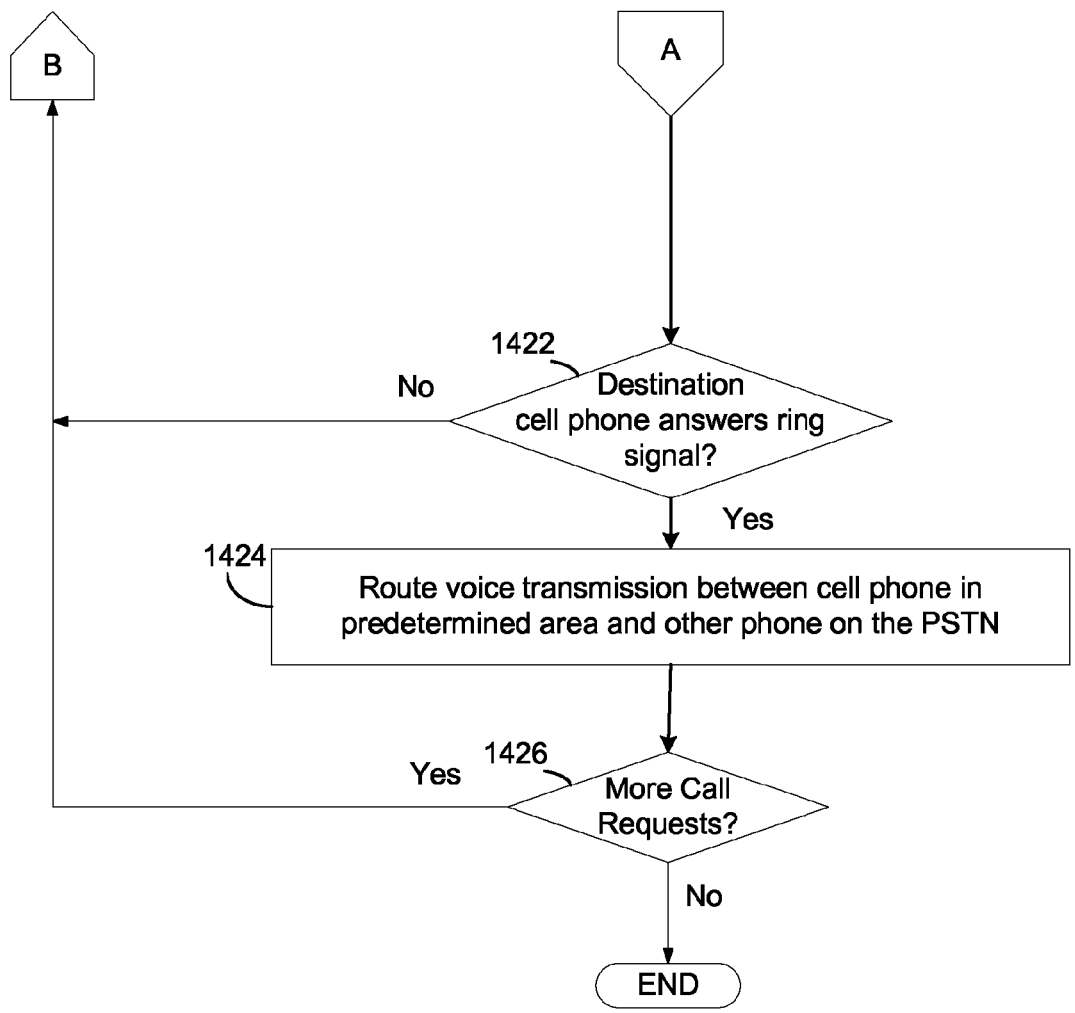

FIGS. 14A-B depicts a flow diagram of an exemplary process 1400 performed by the inter-cell call manager 920 of the cell phone router 104 for handling a call request (i.e., in call request message 682) from a phone 116 on the PSTN to a cell phone 106 or 107 within the predetermined area 108. The inter-cell call manager 920 initially determines whether a call request from a cell phone 116 on the PSTN 112 has been received (step 1402). In one implementation, the inter-cell call manager 920 determines that a call request has been received when a call request message 682 from the PSTN 112 is detected by the air-to-ground cell phone call server system in which the inter-cell call manager 920 is hosted.

If a call request from a cell phone on the PSTN 112 has not been received, the inter-cell manager 920 may continue processing at step 1402. If a call request from a cell phone on the PSTN 112 has been received, the inter-cell call manager 920 determines whether a destination cell phone (e.g., phone 116) associated with the call request is in the predetermined area 108 (step 1404). The inter-cell call manager 920 is operatively configured to parse the call request message 682 to identify the associated destination cell number and then search the HLR 730A-730N or the VLR 736A-736N associated with the service provider corresponding to the call request identified in the call request message 682 to determine whether the destination cell phone (e.g., cell phone 106) is in the predetermined area 108.

If the destination cell phone associated with the call request in the call request message 682 is not in the predetermined area 108, the inter-cell manager 920 may continue processing at step 1402. If the destination cell phone associated with the call request in the call request message 682 is in the predetermined area 108, the inter-cell manager 920 retrieves the destination cell phone information (e.g., SID, phone number, and phone location) from the associated the VLR 736A-736N or HLR 730A-730N (step 1406). The inter-cell manager 920 then configures or commands a base station 206, 208, 210, 212, 214, or 216 and associated antenna to track the destination cell phone (e.g., cell phone 106) in the predetermined area 108 based on the cell phone's location (step 1408). The base station 206, 208, 210, 212, 214, or 216 configured or commanded to track the destination cell phone 106 may be the same base station 206, 208, 210, 212, 214, or 216 associated with the service provider corresponding to the call request in message 682 or another base station 206, 208, 210, 212, 214, or 216 having an antenna monitoring the sector of the predetermined area 108 where the destination cell phone 106 is currently located.

The inter-cell manager 920 then pages the destination cell phone 106 on a control channel associated with the base station 206, 208, 210, 212, 214, or 216 configured to track the destination cell phone 106 (step 1410) and determines whether a response to the page received has been received (step 1412).

If no response to page has been received, the inter-cell manager 920 may retransmit the page or continue processing at step 1402. If a response to the page has been received, the inter-cell manager 920 sends the assigned voice channel or voice channel pair to the destination cell phone 106 via a control channel of the base station 206, 208, 210, 212, 214, or 216 configured to track the destination cell phone 106 (step 1414).

The inter-cell call manager 920 may then transmit a SAT tone or equivalent to the destination cell phone 106 on the assigned voice channel or transmit channel (step 1416). The inter-cell call manager 920 may then determine whether a response to the transmitted SAT has been received on the assigned voice channel or receive channel (step 1418).

If no response to the transmitted SAT has been received, the inter-cell call manager 920 may retransmit the SAT or continue processing at step 1402. If a response to the transmitted SAT has been received, the inter-cell call manager 920 transmits, via the base station 206, 208, 210, 212, 214, or 216 associated with the destination cell phone 106, a ring signal to the destination cell phone (step 1420) in accordance with standard cell phone communication protocols or techniques. The inter-cell call manager 920 then determines whether the destination cell phone 106 has answered the ring signal (step 1422).

If the destination cell phone 106 does not answer the ring signal, the inter-cell call manager 920 may retransmit the ring signal or continue processing at step 1402. If the destination cell phone 106 answers the ring signal, the inter-cell call manager 920 routes voice transmission between the destination cell phone 106 in the predetermined area 108 and the phone 116 on the PSTN 112 via the assigned voice channel or channel pair (step 1424) in accordance with standard cell phone communication protocols or techniques.

As described herein, the inter-cell call manager 920 may be a threaded application capable of handling or managing multiple call request messages 682 in substantially simultaneously or in parallel. Accordingly, the inter-cell call manager 920 next determines whether to check for more call requests (step 1426). If it is determined to check for more call requests, the inter-cell call manager 920 continues processing at step 1402; otherwise, the inter-cell call manager 920 ends processing.

The foregoing description of an implementation of the invention has been presented for purposes of illustration and description. The description is not exhaustive and does not limit the invention to the precise form disclosed. Modifications and variations are possible in light of the above teachings or may be acquired from practicing the invention. For example, the described implementation includes software (e.g., cell phone communication routing manager module 720) but the present implementation may be implemented as a combination of hardware and software or hardware alone. Further, the illustrative processing steps performed by the routing manager 720 or other disclosed modules can be executed in an order different than described above, and additional processing steps can be incorporated. The invention may be implemented with both object-oriented and non-object-oriented programming systems. The scope of the invention is defined by the claims and their equivalents.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. An aircraft comprising:
   a fuselage;
   a cell phone router carried by the aircraft, the cell phone router including a plurality of cell base stations, each cell base station having a plurality of antennas, and
   an antenna control system for controlling the antennas, the control system configured to create a plurality of shaped coverage patterns about a perimeter of the fuselage and move the pattern in a sweeping downward (groundward) direction.

2. The aircraft of claim 1, wherein the antenna groups produce radiation patterns that are directed at a downward angle toward the earth and pointed Right Forward, Right Side, Right Rear, Left Rear, Left Side, Left Forward.

3. The aircraft of claim 1, further comprising an aircraft central computer that provides navigation information to the antenna control system, which controls lookdown angle that varies with range and attitude of an aircraft.

4. The aircraft of claim 1, further comprising a computer for determining location of a cell phone from the coverage patterns.

5. The aircraft of claim 4, further comprising a display for displaying locations of a plurality of cell phones.

6. The aircraft of claim 1, wherein the router further includes an air-to-ground wideband communication interface, whereby the radiation patterns reach the ground while the aircraft is airborne.

7. The aircraft of claim 1, wherein the fuselage has a plurality of windows disposed about a perimeter of the fuselage; and wherein each antenna is associated with and disposed relative to one of the plurality of windows such that each window functions as a radome for the associated antenna.

8. The aircraft of claim 7, wherein the windows functioning as radomes include aircraft cabin windows.

9. An aircraft comprising:
a fuselage having a plurality of windows disposed about a perimeter of the fuselage; and
a cell phone router carried by the aircraft, the cell phone router including a plurality of cell base stations, each base station including a group of antennas;
wherein each antenna is associated with and disposed relative to one of the plurality of windows such that each window of the plurality functions as a radome for the associated antenna; and,
an antenna control system for controlling the antennae to direct shaped radiation patterns out the windows.

10. The aircraft of claim 9, wherein the windows include aircraft cabin windows.

* * * * *